US009913251B2

(12) United States Patent
Takeda et al.

(10) Patent No.: US 9,913,251 B2
(45) Date of Patent: Mar. 6, 2018

(54) APPLICATION LEVEL BROADCAST IN PEER OVERLAY NETWORK

(71) Applicant: Sony Interactive Entertainment Inc., Tokyo (JP)

(72) Inventors: Yutaka Takeda, San Mateo, CA (US); Steven Thomas, Santa Clara, CA (US); Attila Vass, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 274 days.

(21) Appl. No.: 14/818,173

(22) Filed: Aug. 4, 2015

(65) Prior Publication Data

US 2015/0341906 A1 Nov. 26, 2015

Related U.S. Application Data

(60) Continuation of application No. 14/025,487, filed on Sep. 12, 2013, now Pat. No. 9,100,933, which is a division of application No. 12/757,911, filed on Apr. 9, 2010, now Pat. No. 8,549,126.

(51) Int. Cl.

| | |
|---|---|
| ***G06F 15/167*** | (2006.01) |
| ***H04W 72/00*** | (2009.01) |
| *H04L 29/08* | (2006.01) |
| *H04W 84/18* | (2009.01) |

(52) U.S. Cl.

CPC ....... *H04W 72/005* (2013.01); *H04L 67/1053* (2013.01); *H04L 67/1065* (2013.01); *H04L 67/1093* (2013.01); *H04M 2203/205* (2013.01); *H04M 2203/4545* (2013.01); *H04W 84/18* (2013.01)

(58) Field of Classification Search

CPC ................ H04W 72/005; H04W 84/18; H04L 67/1065; H04L 67/1053; H04L 67/1093; H04M 2203/4545; H04M 220/205

See application file for complete search history.

(56) References Cited

U.S. PATENT DOCUMENTS

| | | | |
|---|---|---|---|
| 5,117,420 | A | 5/1992 | Hillis et al. |
| 5,436,905 | A | 7/1995 | Li et al. |
| 7,468,952 | B2 | 12/2008 | Takeda |

(Continued)

OTHER PUBLICATIONS

A. Rowstron et al., "Pastry: Scalable, Decentralized Obhect Location and Routing for Large-Scale Peer-To-Peer Systems", IFIP/ACM International Conference on Distributed Systems Platforms (Middleware), Heidelberg, Germany, Nov. 2001.

(Continued)

*Primary Examiner* — Krisna Lim

(74) *Attorney, Agent, or Firm* — JDI Patent; Joshua Isenberg; Robert Pullman

(57) ABSTRACT

A peer node coupled to a plurality of other peer nodes in an overlay network may process a broadcast message from an upstream peer node containing a plurality of packets by identifying packet missing from the message, identifying an upstream node to which the peer node has an existing inbound connection and which has the missing packet, and obtaining the missing packet from the upstream node. A message from an upstream node may be processed by buffering a subset of the packets of the message in a buffer for a finite period of time before and after the peer node consumes the packets and by identifying one or more of the buffered packets to one or more finger nodes.

14 Claims, 11 Drawing Sheets

(56) References Cited

U.S. PATENT DOCUMENTS

| | | | |
|---|---|---|---|
| 7,620,816 | B1 | 11/2009 | Vigue et al. |
| 7,706,340 | B2 | 4/2010 | Bronez |
| 7,729,280 | B2 | 6/2010 | Takeda et al. |
| 7,738,443 | B2 | 6/2010 | Kumar |
| 8,549,126 | B2 | 10/2013 | Takeda et al. |
| 9,100,933 | B2 | 8/2015 | Takeda et al. |
| 2003/0177240 | A1 | 9/2003 | Gulko et al. |
| 2004/0054807 | A1 | 3/2004 | Harvey et al. |
| 2005/0108203 | A1 | 5/2005 | Tang et al. |
| 2005/0204042 | A1 | 9/2005 | Banerjee et al. |
| 2007/0121570 | A1 | 5/2007 | Takeda et al. |
| 2007/0147371 | A1 | 6/2007 | Radha et al. |
| 2008/0095163 | A1 | 4/2008 | Chen et al. |
| 2008/0165786 | A1 | 7/2008 | Ahuja et al. |
| 2009/0014424 | A1 | 1/2009 | Meschter |
| 2009/0083433 | A1 | 3/2009 | Liu |
| 2009/0086739 | A1 | 4/2009 | Takeda et al. |
| 2009/0144424 | A1 | 6/2009 | Takeda et al. |
| 2010/0165830 | A1 | 7/2010 | Amir et al. |
| 2010/0205481 | A1 | 8/2010 | Zheng |
| 2011/0252122 | A1 | 10/2011 | Takeda et al. |
| 2012/0054818 | A1 | 3/2012 | Noh et al. |
| 2014/0169254 | A1 | 6/2014 | Takeda et al. |

OTHER PUBLICATIONS

PCT International Search Report dated May 9, 2011 for International Application No. PCT/US2011/022151.

Ion Stoica et al., “Chord: A Scalable Peer-to-peer Lookup Protocol for Internet Applications”, IEEE/ACM Transactions on Networking, vol. 11, No. 1, pp. 17-32, Feb. 2003.

Non-Final Office Action for U.S. Appl. No. 14/025,487, dated Jan. 5, 2015.

Non-Final Office Action for U.S. Appl. No. 12/757,911, dated Jan. 29, 2013.

Non-Final Office Action for U.S. Appl. No. 12/757,911, dated Oct. 25, 2012.

Sony Computer Entertainment Incorporated, “Cell Broadband Engine Architecture”, Version 1.0, Aug. 8, 2005.

APPLICATION LEVEL BROADCAST IN PEER OVERLAY NETWORK

PRIORITY CLAIM

This application is a continuation of commonly-assigned U.S. patent application Ser. No. 14/025,487, filed Sep. 12, 2013, now U.S. Pat. No. 9,100,933, the entire disclosures of which are incorporated herein by reference. U.S. patent application Ser. No. 14/025,487 is a divisional application claiming the benefit of priority of commonly assigned U.S. patent application Ser. No. 12/757,911, filed Apr. 9, 2010, the entire disclosures of which are incorporated herein by reference.

FIELD OF THE INVENTION

The present invention relates to peer-to-peer networks and more specifically to broadcasting of content over the peer-to-peer network.

BACKGROUND OF THE INVENTION

Peer to peer (P2P) networks are distributed data networks without any centralized hierarchy or organization. Peer to peer data networks provide a robust and flexible means of communicating information between large numbers of computers or other information devices, referred to in general as nodes. In a P2P network, each node within the P2P network is defined as a peer of every other computing system within the network. Each node within the P2P network may be configured to execute software having substantially equivalent functionality. Therefore, each node may act as both a provider and a user of data and services across the P2P network. Peer to peer data networks provide a robust and flexible means of communicating information between large numbers of computers or other information devices, referred to in general as nodes.

A P2P network relies primarily on the computing power and bandwidth of the nodes in the network rather than concentrating it in a relatively low number of servers. P2P networks are typically used for connecting nodes via largely ad hoc connections. Such networks are useful for many purposes. P2P networks may be used, e.g., for sharing content files containing audio, video, data or anything in digital format is very common, and real-time data, such as telephony traffic, may also be transmitted using P2P technology.

An overlay network is a logical or virtual network organization that is imposed on nodes connected by one or more types of underlying physical network connections. In an overlay network, nodes are connected by virtual or logical links, each of which can correspond with one or more paths in an underlying physical network. Overlay network are typically implemented in hardware and/or software operating in the application layer or other top-level layer of an OSI network stack or other type of networking protocol.

One class of peer to peer overlay networks are referred to as distributed hash table networks. Distributed hash table overlay networks use a hash function to generate and assign one or more key values to a unique node. The set of all possible key values is referred to as a hash space. Nodes are organized in the hash space according to their assigned key values. The hash function is selected so that nodes are approximately evenly distributed throughout the hash space. Distributed hash table overlay networks are typically highly scalable, often supporting millions of nodes; robust, allowing nodes to join or leave frequently; and efficient, routing a message to a single destination node quickly.

There are numerous different types of distributed hash table overlay networks. One type of peer to peer overlay network is known as a Chord network. The Chord overlay network protocol is described in detail in "Chord: A Scalable Peer-to-peer Lookup Protocol for Internet Applications", Ion Stoica, Robert Morris, David Liben-Nowell, David R. Karger, M. Frans Kaashoek, Frank Dabek, Hari Balakrishnan, *IEEE/ACM Transactions on Networking*, Vol. 11, No. 1, pp. 17-32, February 2003, which is incorporated herein by reference. Another type of distributed hash table overlay network is Pastry, which is described in "Pastry: Scalable, distributed object location and routing for large-scale peer-to-peer systems," A. Rowstron and P. Druschel. *IFIP/ACM International Conference on Distributed Systems Platforms* (*Middleware*), Heidelberg, Germany, pages 329-350, November, 2001, which is incorporated herein by reference.

A Chord overlay network may exhibit logarithmic properties arising from "asymptotic complexity" of messaging. For example, if there are N nodes in a Chord ring and a first node wants to send a message to a second node, the first node typically has to communication with some subset of the N nodes in order to locate node B. In a Chord overlay network, the first node generally has to communicate with a very small subset of all N nodes, specifically $\log_2 N$. This property allows a Chord overlay network to have relatively fast messaging, even for a very large number N of nodes. However, a Chord overlay network can only guarantee this $\log_2 N$ messaging property if the IDs of the nodes are completely randomly distributed around the Chord ring.

Although distributed hash table overlay network protocols, such as the chord protocol, provide efficient distribution of a message to a single destination node, they do not allow for a single message to be efficiently distributed to multiple destination nodes, referred to as broadcasting (or multicasting) a message.

In one typical implementation, a node desiring to broadcast a message to all of the other nodes must send a message to each node separately. As each node only has direct knowledge of a limited number of nodes, a node initiating a broadcast message, referred to as an initiating node, must blindly send messages to all possible key values. For distributed hash table networks, this entails sending a separate message to each possible key value. For a distributed hash table network with a hash space of 2^160 (arising from the use of a 160-bit hash function such as SHA-1), this is unfeasible.

In another typical implementation, a flooding approach is used to distribute a broadcast message. An initiating node sends a message to all of the nodes directly connected with the initiating node in the overlay network. Upon receiving the message, each receiving node in turn forwards the message to any additional nodes directly connected with each receiving node in the overlay network. This implementation is inefficient, as some nodes receive the same message more than once. Moreover, this implementation consumes a large amount of network bandwidth and takes a large amount of time to implement.

To reduce the bandwidth required by flooding broadcast messages, a modified flooding scheme assigns a time-to-live (TTL) value to each broadcast message. Each time a copy of a broadcast message is forwarded to additional node, its TTL value is decremented. When the TTL value reaches 1, the broadcast message is no longer forwarded. Although this modified flooding scheme reduces the amount of wasted network bandwidth and the number of duplicate messages, it cannot ensure that the broadcast message will be routed to all nodes.

It is therefore desirable for a system and method to guarantee each node in a peer to peer overlay network receives a broadcast message. It is further desirable that the system and method guarantees that each node in a peer to peer overlay network receives only one copy of a broadcast message, thereby ensuring that network bandwidth is efficiently utilized. It is further desirable that the system and method require minimal time and bandwidth resources from a node initiating a broadcast message. It is also desirable that the system and method enable broadcast messages to be selectively directed to portions of the overlay network with no additional network bandwidth overhead. It is desirable for the system and method to deliver broadcast messages to all or a selected portion of the peer to peer overlay network within a minimal time period.

It is within this context that embodiments of the present invention arise.

BRIEF DESCRIPTION OF THE DRAWINGS

Embodiments of the present invention may be readily understood by considering the following detailed description in conjunction with the accompanying drawings, in which.

DESCRIPTION OF THE SPECIFIC EMBODIMENTS

Figure 1:
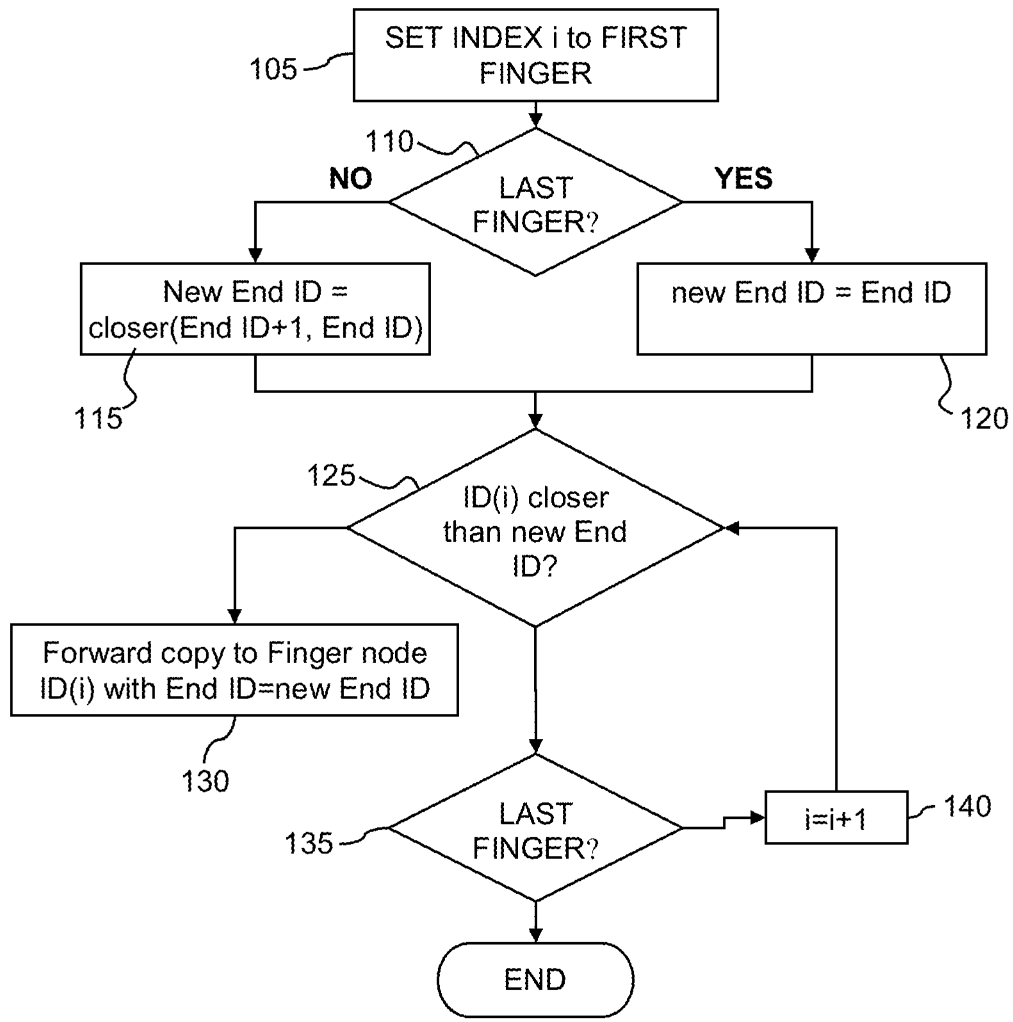
FIG. 1 is a flow diagram illustrating a method of broadcasting a message with an End ID in an overlay network.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the present invention address the problem of application-level multicasting in a peer-to-peer network.

INTRODUCTION

Each node in a peer-to-peer overlay network is assigned a unique key. In addition each shared file on the network is also assigned a unique key. When a new peer or file is added to the circle or new information about a peer is generated that information is published to a hash table as a hash number generated according to some hash function. Thus, the hash table may be regarded as a database in which each database entry has a hash number. The hash numbers are chosen from an identifier (ID) space that covers a sufficiently large range of numbers that two entries are extremely unlikely to be hashed to the same identifier number. For example, the well-known SHA-1 hash function has 160 bits, which may represent $(2^8)^{20}$ different numbers. Peers randomly choose an identifier from the ID space and organize themselves into the circle. Each published object in the hash table is a pointer back to a particular peer that has that object. The hash table is said to be distributed in the sense that each of the peer nodes in the network is responsible for keeping track of a different range of keys that make up the hash table.

When a peer joins the hash table, it is assigned responsibility for a particular range of keys in the ID space of the hash table. Each peer maintains a finger table stored in a memory that provides a fast lookup into the ring. The topology of the nodes in the overlay network may be dynamic. Nodes can join or leave the overlay network at any time. When a node departs the overlay network, the links between the departing node and any related nodes should be updated. In general, the update should change links to the departing node in other nodes' finger tables or other node references to valid nodes. Additionally, new links should be established to nodes previously linked to by the departing node's finger table or other node references. Joining nodes should be added to other nodes' finger tables. Additionally, finger tables or other links should be established for the joining nodes. Example protocols for handling nodes joining or leaving the overlay network are discussed in detail in the above-cited references.

Generally, each peer node in the network needs to be able to communicate directly with every node in its finger table. This may be implemented by a persistent connection, but it is not required. Persistent connections are an optimization that most Chord implementations choose to use, but are not fundamentally necessary for operation of a Chord network. Nodes in the network may have direct communication available with any other nodes. Typically, connectivity to non-finger table nodes may be implemented with some sort of fixed size cache. For example, a node might keep connections open to K non-finger table nodes. Again, this is merely an optimization that can be used to avoid performing a Chord lookup using the finger table.

There has been an emerging trend to implement online video games using P2P networks. Another emerging trend has been the development and popularity of a "spectator" mode in such online video games. In the spectator mode, which is preferably implemented at the application level, one peer acts as an agent that handles a "virtual camera" that observes activity within the game. The agent broadcasts the activity captured by the virtual camera to other nodes in the P2P network. Implementation of a large scale online match spectator mode in a P2P network involves sending high bandwidth data (e.g., audio/video streaming) to all nodes in the same overlay.

Commonly assigned U.S. Pat. No. 7,468,952 (which is incorporated by reference herein in its entirety) describes a way of handling broadcast messaging in peer to peer overlay network. In U.S. Pat. No. 7,468,952, broadcast messages include an End ID parameter specifying the range of key values for nodes that should receive a broadcast message. Each node of an overlay network maintains a list of finger nodes and their respective key values. Upon receiving a broadcast message, a node assigns a finger node a new End ID value based upon the End ID value of the broadcast message or the key value of an adjacent finger node. The node compares a finger node's new End ID value with the finger node's key value to determine whether to forward the broadcast message to that finger node. A broadcast message forwarded to a finger node includes an End ID parameter equal to the new End ID value determined for the finger node. Nodes can aggregate response messages from their finger nodes.

U.S. Pat. No. 7,468,952, which is incorporated herein by reference, describes a technique for broadcasting messages from a node to all other nodes in an overlay network. Each node broadcasting the message adds an "end ID" to each copy of the message that it sends. The end ID is determined simply by the ID of next neighbor of the recipient node if it is not the last node in the sending node's finger table, or by the ID of the recipient node if it is the last node in the sending node's finger table.

By way of example, the End IDs for each copy of the message can be determined according to a method 100 of routing a broadcast message in an overlay network according to an embodiment of the invention. Method 100 efficiently directs broadcast messages to all of the nodes in the overlay network without wasting network bandwidth on duplicate messages or omitting any nodes.

Method 100 can be initiated upon a node receiving or initiating a broadcast message. Each broadcast message includes an End ID parameter. The End ID parameter represents the range of key values of nodes that the broadcast message may be forwarded to. For example, if a node receives a broadcast message with an End ID value of 17, then the node may forward a copy of the broadcast message to any node in its finger table with a key value less than 17. Furthermore, each forwarded copy of the broadcast message is assigned an End ID value according to method 100 to prevent duplicate messages from being sent to nodes.

A received broadcast message is processed by a node as follows. As indicated at 105, the node sets an index value i to the first entry of the node's finger table. In a first decision block 110, the node determines whether the finger table entry specified by the index value i, referred to as the selected finger table entry, is the last entry of the node's finger table. If so, then method 100 proceeds from the first decision block 110 to assign the parameter new End ID to be equal to the End ID of the received broadcast message as indicated at 120.

Conversely, if the node determines that the selected finger table entry is not the last entry of the node's finger table, method 100 proceeds from the first decision block 110 to block 115.

At block 115 the parameter new End ID is assigned to be equal to the key value of the next finger table entry (i.e. the finger table entry specified by index i+1) or the End ID of the received broadcast message, whichever is closer to the current node in the hash space. The distance between the current node and a key value, such as the next finger table entry or the current End ID, can determined in an embodiment by subtracting the current node's key value from the other key value.

In this example, at block 115 it is assumed that the entries of the finger table are arranged in order of the key values of their respective nodes and that broadcast messages are to be communicated to nodes in order of increasing key values. However, in alternate embodiments, the finger table can be arranged in a different order. In these embodiments, the parameter new End ID may be assigned to be equal to the finger table entry key value greater than and closest to the key value of the selected finger table entry at bock 115. This embodiment communicates broadcast messages to nodes in order of increasing key values. In a further embodiment, if broadcast messages are to be communicated to nodes in order of decreasing key values, then at block 115 the parameter new End ID is assigned to be equal to the finger table entry key value less than and closest to the key value of the selected finger table entry.

Following block 115 or block 120, method 100 proceeds to a second decision block 125. In the second decision block 125, the node determines if the key value of the selected finger table entry is less than the value of the new End ID parameter. If so, method 100 proceeds to block 130. Otherwise, method 100 proceeds directly to a third decision block 135.

At block 130 the node forwards a copy of the broadcast message to the node associated with the selected finger table entry. The forwarded copy of the broadcast message includes an End ID value set to the value of the new End ID parameter.

Following the second decision block 125 or block 130, the method 100 proceeds to the third decision block 135. At decision block 135 the node determines if the selected finger table entry is the last entry of the node's finger table. If so, then method 100 may end and the node is finished forwarding the broadcast message.

If at decision block 135 the node determines that the selected finger table entry is not the last entry of the node's finger table, method 100 proceeds to block 140. At block 140 the node increments the index i, thereby selecting the next finger table entry of the node's finger table. Following block 140, method 100 proceeds back to the first decision block 110. The operations at 110, 115, 120, 125, 130, 135, and 140 may be repeated as many times as necessary to evaluate all of the entries of the node's finger table.

Figure 2A:
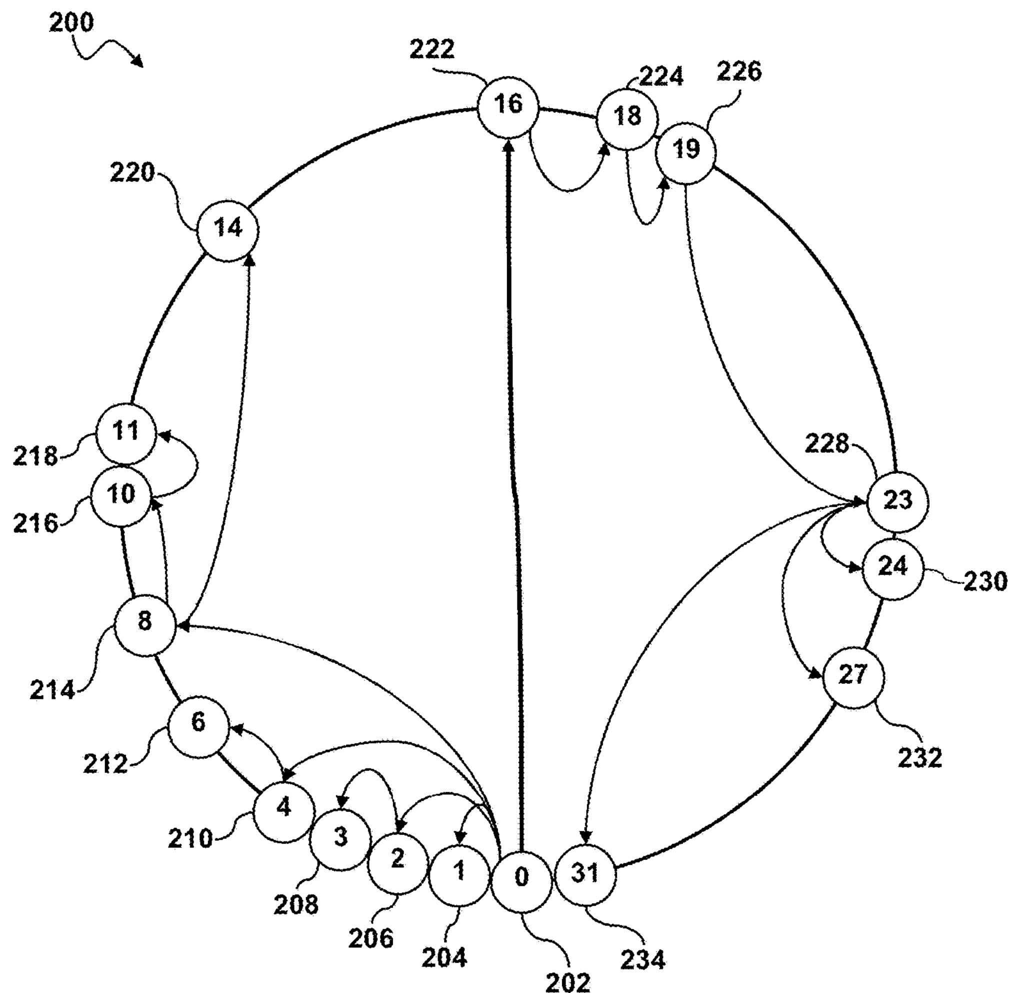
FIGS. 2A-2B are schematic diagrams illustrating an example of broadcasting a message in an overlay network.
Figure 2B:
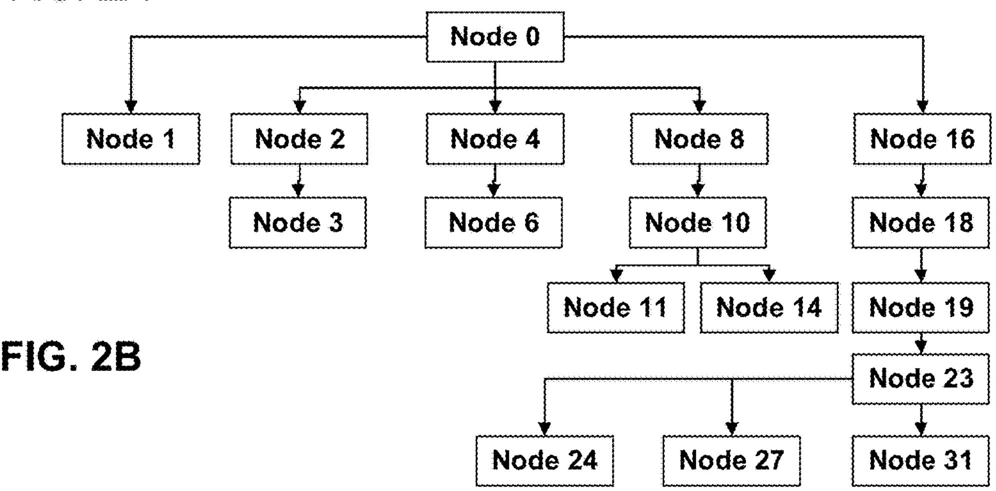

FIGS. 2A-2B schematically illustrate an example of implementation of the method described above in a P2P network. In a typical P2P implementation, a large number of peers connected to the Internet are organized into a ring to form a peer-to-peer network 200 as shown in FIG. 2A. In this example, the network 100 includes peer nodes 202, 204, 206, 208, 210, 212, 214, 216, 218, 220, 222, 224, 226, and 228. Not all nodes connected to the network 200 are shown for the sake of simplicity. Each peer node is assigned a unique identifier referred to as a key. These identifiers may be evenly and randomly distributed. However, this is not a strict requirement for all embodiments of the present invention.

For the purposes of example, the assignment of keys to peer nodes in network 200 and the keys in each node's finger table may be as shown in Table I below:

TABLE I

| NODE | KEY | Finger values |
|---|---|---|
| 202 | 0 | 1, 2, 4, 8, 16 |
| 204 | 1 | 2, 3, 5, 9, 17 |
| 206 | 2 | 3, 4, 6, 10, 18 |
| 208 | 3 | 4, 5, 7, 11, 19 |
| 210 | 4 | 5, 6, 8, 10, 20 |
| 212 | 6 | 7, 8, 10, 12, 22 |
| 214 | 8 | 9, 10, 12, 14, 24 |
| 216 | 10 | 11, 12, 14, 18, 26 |
| 218 | 11 | 12, 13, 15, 19, 27 |
| 220 | 14 | 15, 16, 18, 22, 30 |
| 222 | 16 | 17, 18, 20, 28, 1 |
| 224 | 18 | 19, 20, 22, 26, 3 |
| 226 | 19 | 20, 21, 23, 27, 4 |
| 228 | 23 | 24, 25, 27, 31, 8 |
| 230 | 24 | 25, 26, 28, 1, 9 |
| 232 | 27 | 28, 29, 31, 3, 11 |
| 234 | 31 | 0, 1, 3, 5, 7, 15 |

It is noted that not every key in a given node's finger table necessarily corresponds to a node.

Improved Overlay Broadcast

To ensure that the broadcast message is sent to all nodes in the overlay, any node that must send copies of the broadcast message should at least send a copy to the next node in the overlay according to the node order. The other nodes may be distributed in any way amongst the remaining nodes in the sending node's finger table. By way of example, if it is possible to send more than one node it is desirable for the recipient nodes to include a last node in the sending node's finger table according to the node order.

The broadcasting of the message on the network 200 in accordance with the method 100 is illustrated in FIGS. 2A-2B and summarized in Table II below. Suppose, for the sake of example, node 202 with key value 0 initiates or receives a message for broadcast to the rest of the nodes in the network 200. According to the technique discussed above, the node 202 can send copies of the message to nodes 204, 206, 210, 214, and 222 (corresponding to key values 1, 2, 4, 8, and 16 respectively) along with end ID's 2, 4, 8, 16, and 0 respectively.

Node 204 doesn't send a copy of the message since the next node in its finger table has a key value 2, which corresponds to the end ID received by node 204. Node 206 sends a copy to node 208 (key value 3) with end ID=4. Node 206 does not send a copy to any other node since the next key value (4) is equal to the end ID received by node 206. Node 210 sends a copy only to node 212 (key value 6) with end ID=8 because there is no node with key value 5 and the last key value in the finger table for node 210 is 8, which is the end ID received by node 210. Node 212 doesn't send a copy because there are no nodes at any key values in its finger table at values between its own key value of 6 and the end ID=8 received from node 210.

Node 214 (key value 8) sends a copy to node 216 (key value 10) with end ID 11. Node 214 also sends a copy to node 220, (key value 14) with end ID=16, which is equal to the end ID received by node 214 from node 202. Node 216 (key value=10) sends a copy to node 218 (key value 11) with end ID 14. Node 218 doesn't send a copy since there are no nodes at the values in its finger table between its key value of 11 and the end ID of 14 that it received from node 216. Node 220 (key value 14) doesn't send a copy since there are no nodes at the values in its finger table between itself and the end ID of 16 that it received from node 214.

Node 222 (key value 16) only sends a copy with end ID=0 to node 224 (key value=18) since there are no other nodes at the values in its finger table between itself and the end ID of 0 that node 222 received from node 202. Node 224 similarly sends a copy only to node 226 (key value=19) also with end ID=0. Node 226 sends a copy only to node 228 (key value 23), which sends copies to nodes 230 (key value 24), 232 (key value 27), and 234 (key value 31) with end ID's 27, 31 and 0 respectively.

TABLE II

| Node (key value) | Finger values | Sends to (end ID) | # of Hops to receive message |
|---|---|---|---|
| 202 (0) | 1, 2, 4, 8, 16 | 1 (2), 2 (4), 4 (8), 8 (16), 16 (0) | 0 |
| 204 (1) | 2, 3, 5, 9, 17 | Doesn't send | |
| 206 (2) | 3, 4, 6, 10, 18 | 3 (4) | 1 |
| 208 (3) | 4, 5, 7, 11, 19 | Doesn't send | 2 |
| 210 (4) | 5, 6, 8, 10, 20 | 6 (8) | 1 |
| 212 (6) | 7, 8, 10, 12, 22 | Doesn't send | 2 |
| 214 (8) | 9, 10, 12, 14, 24 | 10 (11), 14 (16) | 1 |
| 216 (10) | 11, 12, 14, 18, 26 | 11 (11) | 2 |
| 218 (11) | 12, 13, 15, 19, 27 | Doesn't send | 3 |
| 220 (14) | 15, 16, 18, 22, 30 | Doesn't send | 3 |
| 222 (16) | 17, 18, 20, 28, 1 | 18 (0) | 1 |
| 224 (18) | 19, 20, 22, 26, 3 | 19 (0) | 2 |
| 226 (19) | 20, 21, 23, 27, 4 | 23 (0) | 3 |
| 228 (23) | 24, 25, 27, 31, 8 | 24 (27), 27 (31), 31 (0) | 4 |
| 230 (24) | 25, 26, 28, 1, 9 | Doesn't send | 5 |
| 232 (27) | 28, 29, 31, 3, 11 | Doesn't send | 5 |
| 234 (31) | 0, 1, 3, 5, 7, 15 | Doesn't send | 5 |

FIG. 2B illustrates the propagation of the message from node to node according to each node's key value. As may be seen from Table II above and FIG. 2B, the message is broadcast from the initiating node to the final node in five "hops".

In the technique described above, every node attempts to send N copies of a message where N is the number of finger nodes in the sending node's finger table. This technique allows messages to be broadcast while avoiding the problem of nodes receiving multiple copies of the same message. For example, node 202 must send copies to five other nodes.

However, if the data transmission requires large bandwidth (such as for broadcasting a video stream), a node may not have sufficient bandwidth to generate and send N copies of a message. For example, if a node is receiving broadcasting data at a rate of 128 kbps and the number of its finger nodes is 16, the node must forward the data to 16 finger nodes according to the prior art, which, in this example, requires 2 Mbps of uplink bandwidth. This requirement may be larger than the uplink bandwidth available for a majority of residential Internet services. To scale up the broadcast capability of a peer overlay network one would have to either increase the available bandwidth or processing power or approach the problem in a different way.

Also, as the data propagates over multiple nodes, some data may be lost either due to packet loss over the IP network, or due to churn in the overlay. For example, in a Chord overlay, it is required for each node to have successful connections to its successor and its predecessor nodes. Embodiments of the invention solve these issues by exploiting the Chord's flexibility in neighbor (finger nodes) selections, and presence of inbound connections at each node for possible data loss recovery.

Embodiments of the present invention provide a way to broadcast high-bandwidth data to all nodes in the same Chord overlay where available bandwidth and processing power are limited. Such embodiments may be applied to large scale audio/video streaming applications (e.g., a large scale online match spectator system) that require all peer nodes to relay data to downstream peer nodes in a way that scales the system to the number of nodes, while reducing bandwidth cost at a server.

To overcome this uplink bandwidth limitation, the method described above may be modified so that each node sends copies of a broadcast message only to a subset of the nodes in its finger table, where the number of nodes in the subset depends on the uplink bandwidth available to the node sending the copies. Specifically, in embodiments of the present invention, each node that either initiates or receives a broadcast message determines its available uplink bandwidth that is available to the node. The node then sends the message to the first node in its finger table and as many other nodes as the available uplink bandwidth permits. Each copy of the message is sent with an End ID, which may be determined as described above.

Figure 3:
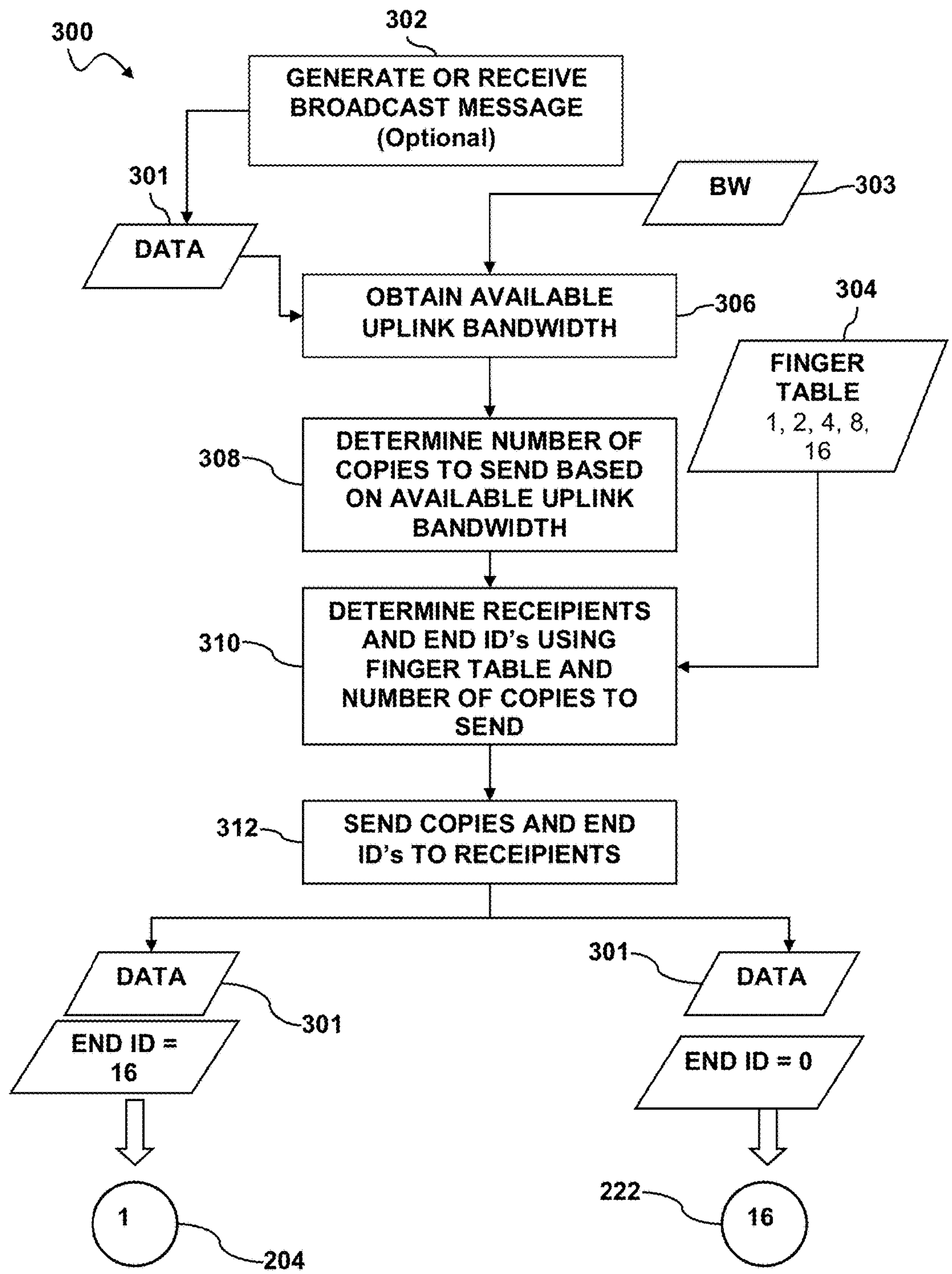
FIG. 3 is a flow diagram illustrating a method for application-level multi-casting a message with a peer node in an overlay network according to an embodiment of the present invention.

The flow diagram depicted in FIG. 3 illustrates an example of a method 300 according to an embodiment of the present invention. The method 300 may be implemented by one or more peers in a peer-to-peer network at an application level of a program. For example, the method 300 could be implemented at application level as part of an online video game program that allows users of different peer devices to participate in a game online over a network. Such an online video game may include spectator mode as described above.

In the method 300, a node may either receive or initiate a broadcast message 301 as indicated at 302. By way of example, and not by way of limitation, receiving or initiating a broadcast message may include implementing the part of spectator mode. Specifically, a node acting as an agent may be configured to control a virtual camera within an online game and broadcast the activity captured by the virtual camera to other nodes as digital video packets so that the other nodes can participate in the game as spectators. The node acting as agent could also broadcast audio commentary in the form of digital audio packets. Commentary in the form of text or graphics could also be broadcast in the form of suitably configured packets. The commentary could be synchronized to the activity captured by the virtual camera, e.g., by appropriate time stamps associated with the packets that are broadcast.

A node that implements the method 300 has access to a finger table 304 stored in a memory. The finger table 304 contains key values that include key values for nodes and files for which it is responsible. As indicated at block 306 the node obtains the uplink bandwidth BW 303 available to it.

By way of example, and not by way of limitation, the node may obtain the uplink 303 by retrieving a stored value from memory. The stored value may be determined in a separate process that is independent of the method 300. The bandwidth determination may be performed with the node or by a different node. There may be any number of different ways to estimate available bandwidth 306. By way of example, and not by way of limitation, available bandwidth may be estimated as described in commonly assigned U.S. patent application Ser. No. 12/267,254, published as U.S. Patent Application Publication Number US 2009-0144424 A1, the entire contents of which are incorporated herein by reference.

As an alternative example, a special server can be used where, before joining overlay, every node sends a relatively large packet to the server. The server can observe how long it has taken to receive the whole packet and then report the result (speed=size/time-taken) back to the node. The result can be used by the node as an initial bandwidth estimation. Of course, available bandwidth may change over time. Each node can receive a feedback from its destination nodes about indications of bandwidth congestion, such as packet loss or a growth of delay. Based on this feedback, the node can gradually reduce its estimated bandwidth until the congestion is mitigated. Every time a node sends a broadcast message, it can use the current knowledge of the estimated bandwidth 303.

Once the available uplink bandwidth is determined, the node may determine a number N of copies to send based on the available uplink bandwidth BW, as indicated at block 308. By way of example, and not by way of limitation, the number of recipient nodes may be determined from simple considerations of the available bandwidth BW in bytes per second, a size S of the broadcast message in bytes, and an available time T in seconds for sending the N copies of the message must be sent. The number N of copies may be determined as the integer value closest to (BW·T)/S. The node may be configured so that the number N of copies is always 1 or greater. Once the number of copies has been determined, the node can determine which nodes in the finger table should receive a copy of the message.

Once the number N of copies to send has been determined, the node may determine the key values for the recipients of the copies and End ID's to send with each copy as indicated at block 310 and send the copies and End ID's to the recipient nodes, as indicated at block 312. The node may determine the key values for the recipients of the copies and End ID's using the finger table 304 and the number N of copies to send. By way of example, the node may be configured to always send a copy to the node in its finger table having the next highest key value. E.g., node 202 with key value 0 would always send a copy to node 204 with key value 1.

It is noted that, except for selection of the next node in the overlay, the selection of the recipient nodes is somewhat arbitrary. For example, node 202 may determine there is only enough uplink bandwidth to send two copies of the message. Node 202 may automatically send one copy to node 204 with End ID 16 and send the other copy to node 222 with key value 0, respectively. In this case node, 202 sent the second copy to the highest key value node in its finger table. The End ID's sent with each message may be determined as described above with respect to FIG. 1.

Figure 4A:
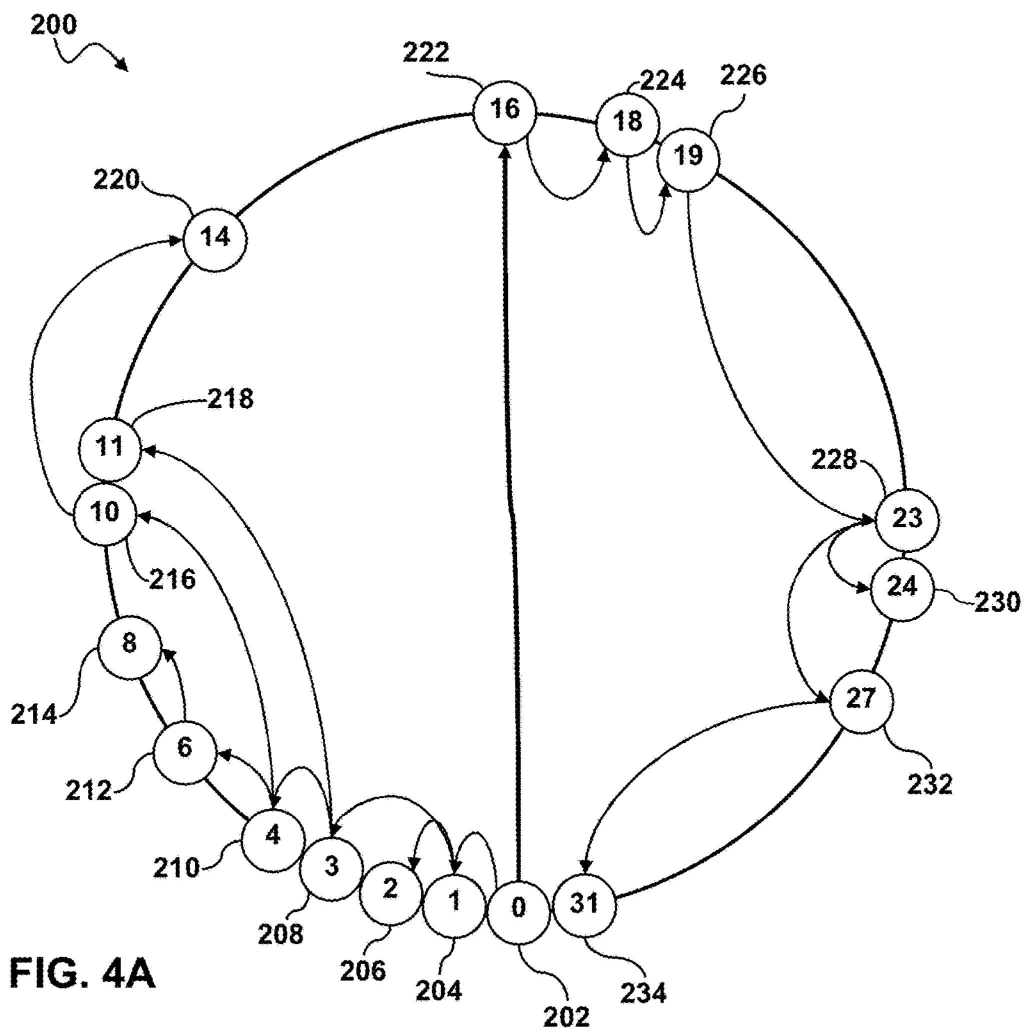
FIGS. 4A-4B are schematic diagrams illustrating an example of broadcasting a message in an overlay network according to an embodiment of the present invention.
Figure 4B:
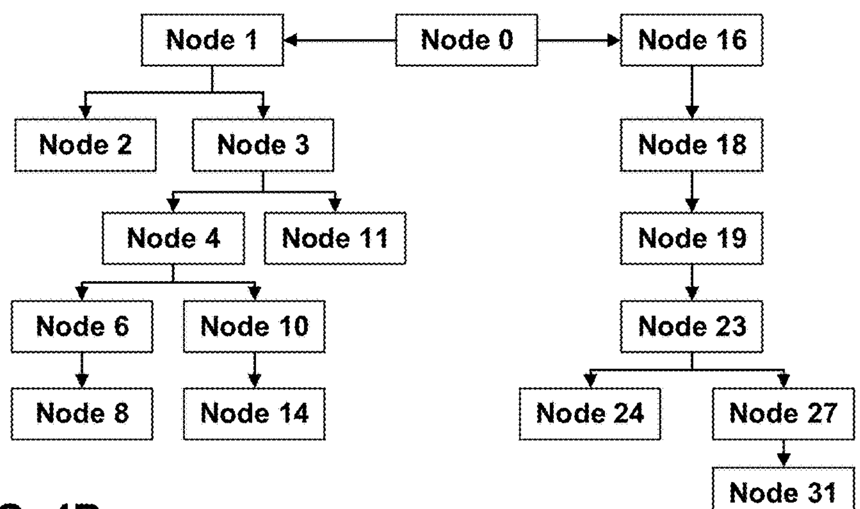

By way of example, and not by way of limitation, broadcasting of a message according to the method 300 of FIG. 3 over the rest of the network 200 may take place as illustrated in FIGS. 4A-4B and summarized in Table III below.

Specifically, Node 204 can determine that it can only send two copies and sends them to nodes 206 and 208 with end IDs 3 and 16 respectively. Node 206 doesn't send any copies of the message since there are no nodes between itself and the End ID of 3 that it received from node 204. Node 208 sends copies to nodes 210 and 218 with End ID's of 11 and 16 respectively. Node 210 can only send two copies and sends copies to nodes 212 and 214 with End ID's of 8 and 11 respectively. Node 212 doesn't send any copies of the message since there are no nodes in its finger table between its key value of 6 and the End ID of 8 that it received from node 210. Node 214 only sends a copy to node 216 since there are no other nodes in its finger table between its key value of 8 and the End ID of 11 that it received from node 210. Node 216 doesn't send any copies of the message since there are no nodes in its finger table between itself and the End ID of 11 that it received from node 214.

Node 218 only sends a copy to node 220 since there are no other nodes in its finger table between itself and the End ID of 16 that it received from node 208. Node 220 doesn't send any copies since there are no nodes in its finger table between itself and the End ID of 16 that it received from node 218. Node 222 forwards the copy it received from node 202 only to node 224 since there are no other nodes in node 222's finger table between node 222's key value of 16 and the End ID of 0 that it received from node 202. Node 224 only forwards a copy to node 226 for two reasons. One reason is that node 224 only has enough bandwidth available to send a single copy. The other reason is that there are no nodes at any key values between node 224's key value of 18 and the End ID of 0 that node 224 received from node 222.

Table III below summarizes the broadcasting of the message from node 202 to the other nodes.

TABLE III

| Node (key value) | Finger values | Copies permitted within target time by available Uplink BW limit | Sends copies to nodes (End ID) | # of Hops to receive message |
|---|---|---|---|---|
| 202 (0) | 1, 2, 4, 8, 16 | 2 | 1 (16), 16 (0) | 0 |
| 204 (1) | 2, 3, 5, 9, 17 | 2 | 2 (3), 3 (16) | 1 |
| 206 (2) | 3, 4, 6, 10, 18 | 1 | Doesn't send | 2 |
| 208 (3) | 4, 5, 7, 11, 19 | 5 | 4 (11), 11 (16) | 2 |
| 210 (4) | 5, 6, 8, 10, 20 | 2 | 6 (8), 8 (11) | 3 |
| 212 (6) | 7, 8, 10, 12, 22 | 3 | Doesn't send | 4 |
| 214 (8) | 9, 10, 12, 14, 24 | 1 | 10 (11) | 5 |
| 216 (10) | 11, 12, 14, 18, 26 | 2 | Doesn't send | 4 |
| 218 (11) | 12, 14, 15, 19, 27 | 2 | 14 (16) | 3 |
| 220 (14) | 15, 16, 18, 22, 30 | 4 | Doesn't send | 3 |
| 222 (16) | 17, 18, 20, 28, 1 | 2 | 18 (0) | 1 |
| 224 (18) | 19, 20, 22, 26, 3 | 1 | 19 (0) | 2 |
| 226 (19) | 20, 21, 23, 27, 4 | 2 | 23 (27), 27 (0) | 3 |
| 228 (23) | 24, 25, 27, 31, 8 | 2 | 24 (27) | 4 |
| 230 (24) | 25, 26, 28, 1, 9 | 2 | Doesn't send | 5 |
| 232 (27) | 28, 29, 31, 3, 11 | 2 | 31 (0) | 6 |
| 234 (31) | 0, 1, 3, 5, 7, 15 | 2 | Doesn't send | 7 |

It is noted that in the example described above, nodes 208, 212 and 220, which have relatively high uplink bandwidth, are underutilized. Node 208 can send up to five copies, but only sends two copies. Node 212 can send three copies and node 220 can send four copies, but neither of these nodes forwards any copies. This is largely due to the somewhat uneven distribution of high bandwidth nodes in the overlay. One consequence of this is that it takes seven hops for the message to travel from node 202 to node 234. In embodiments of the present invention, nodes can optimize a method for broadcasting messages by selectively updating the nodes in their finger tables to ensure that high bandwidth nodes can forward as many copies of a message as possible.

Figure 5:
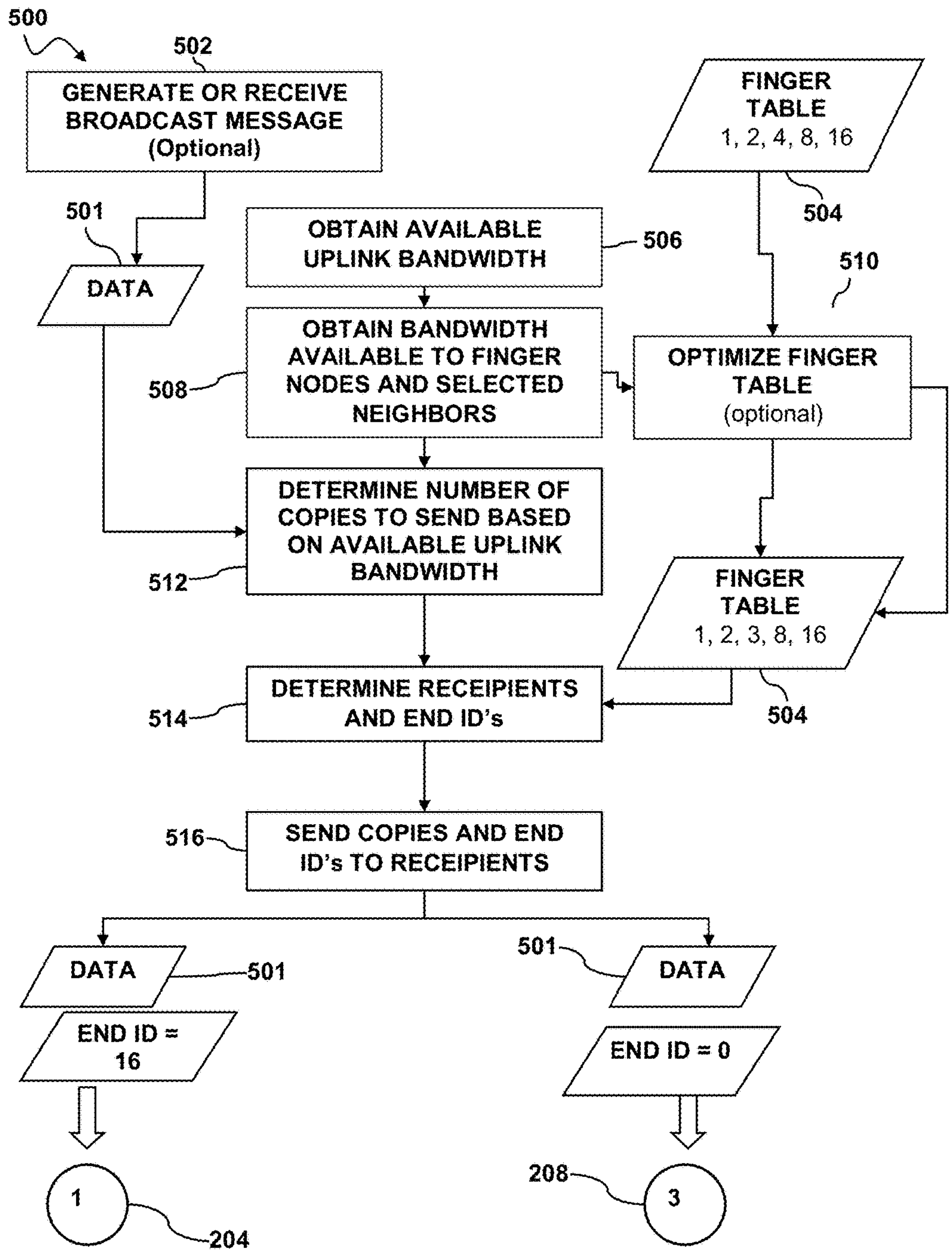
FIG. 5 is a flow diagram illustrating a method for application-level multi-casting a message in an overlay according to an alternative embodiment of the present invention.

By way of example, the flow diagram of FIG. 5 illustrates an example of a method 500 for application-level multi-cast in an overlay network according to an alternative embodiment of the present invention. The method 500 may be implemented by one or more peers in a peer-to-peer network at an application level of a program, e.g., as part of an online video game program that allows users of different peer devices to participate in a game online over a network.

In the method 500 a node may either receive or initiate a broadcast message 501 as indicated at 502. By way of example, and not by way of limitation, receiving or initiating a broadcast message may include implementing the part of spectator mode, e.g., as discussed above with respect to FIG. 3. A node implementing the method 500 has a finger table 504 with key values that include key values for nodes for which it is responsible. As indicated at block 506 the node determines the uplink bandwidth BW available to it. This may be accomplished, e.g., as discussed above with respect to block 306 of FIG. 3.

Once the available uplink bandwidth is obtained, the node may determine a number N of copies that it can send based on the node's available uplink bandwidth BW, as indicated at block 510.

In addition to obtaining its own available uplink bandwidth, the node may also obtain the uplink bandwidth available to other nodes as indicated at 508. This bandwidth data may include the uplink bandwidth available finger nodes in its finger table and selected finger nodes of those finger nodes. Each node may use this information to optimize its finger table to ensure that it contains at least one high bandwidth node that can be used for forwarding broadcast messages.

By way of example, a node may send a query to each node in its finger table regarding the bandwidth available to those nodes. Each of those nodes may obtain their available bandwidths, e.g., as discussed above with respect to block 306 of FIG. 3, and send a reply with the bandwidth information. To limit the number of queries and responses that need to be sent, each node that receives a query can in turn query of few of its finger nodes having key values that are relatively close, e.g., a few key values ahead of or behind the querying node in key order. By way of example, each node may query from 1 or 2 up to 8 or 10 nodes ahead of it in key order that are in its finger table and from 1 or 2 up to 8 or 10 nodes behind it in key order to which it has inbound connections. To improve scalability as the number of nodes in the overlay increases, it is desirable to either fix the number of nodes that are queried or to place a fixed upper limit on the number of nodes that are queried. Each node can transmit its bandwidth to the nodes in its finger table on a regular basis and to all of the nodes to which it has inbound connections on a regular basis. The optimum number of neighbors for which each key node obtains bandwidth information may depend on memory and bandwidth available to a node. The process of obtaining this bandwidth information can be done periodically, e.g., once every 10 seconds rather than sending a query when a broadcast message is sent. Furthermore, the process of obtaining bandwidth information can be performed in the background asynchronously to the transmission time of broadcast messages.

Once the node has obtained information on the available uplink bandwidths for the nodes in its finger table and their neighbor nodes, the node may be configured to utilize information about the uplink bandwidth data available to other nodes in selection of the key values and EndID's at 514. In general, a node may try to ensure that the highest EndID possible is sent in as few hops as possible to node with the highest known bandwidth. For example, node 202 may determine from the bandwidth information obtained at 508 that node 206 can only send one copy but that node 208 has sufficient bandwidth to forward five copies of the message. If node 202 determines that it can only send two copies, it can use the bandwidth information obtained at 508 to determine the recipient nodes and EndIDs as follows. Node 202 must send one copy to node 204 by default. Node 202 can determine that high bandwidth node 208 is the first node in the finger table for node 206. This means that node 206 must send a copy to node 208 with the same EndID that is received from node 202. Based on this information, node 202 can send one copy to node 204 with EndID 3 and one copy to node 206 with EndID 0. Since node 206 can only send a single copy, it sends a copy to the next node downstream, which is high bandwidth node 208, with EndID 0. Node 208 can send copies to each of the nodes in its finger table.

In some embodiments, a node can use the bandwidth information obtained at 508 to determine whether to optimize its finger table, e.g., by attempting to make a connection to a different node and drop a connection to an existing node in its finger table as indicated at 512. The process of finger table optimization can be done periodically, but perhaps less frequently than obtaining bandwidth information. By way of example, and not by way of limitation, each node may optimize its finger table (or determine whether it needs to update its finger table) once every minute or so. Alternatively, the node may perform the optimization only when a change in uplink speed for one of its finger nodes is detected. Thus, the overlay can organically adapt to changing network conditions and optimize broadcasting of messages.

A few general patterns for successful optimization of finger tables in conjunction with End ID's can be summarized as follows. First, it is generally desirable for a node to maintain the next node in key order in its finger table. This ensures that a broadcast message can always be forwarded. Second, as a result of optimization, a high BW node may have many inbound connections. When one node is broadcasting there is only one inbound connection from which any given node receives broadcast data. The broadcast source may change but there is generally only one broadcast source at a time. If there is only one source for inbound broadcast data, it is unlikely for there to be a situation where all inbound connections will be sending large amounts of data. Third, if a node has high bandwidth it might limit the number of nodes that can make inbound connections to it in order avoid exhaustion of resources for inbound connections. Fourth, when a node optimizes its finger table it is important to establish connection to new node before breaking the existing connection to an old one in its finger table.

By way of example, and not by way of limitation, node 202 could find out from nodes 204, 206, 210, 214 and 222 which neighbor nodes are in their finger tables and which neighbor nodes they have inbound connections from, the bandwidths of these neighbor nodes are and what are the bandwidths of their −2, −1, +1, and +2 neighbors. Node 202 can use this information to optimize its finger table. The other nodes in the overlay can attempt to similarly optimize their finger tables. An example of an optimization resulting from such a process is discussed as follows and summarized in Table IV below. For convenience, in Table IV, the bandwidths have been expressed as copy values, which represent the number of copies a node can send.

Node 202 can use the bandwidth information obtained from node 206 to determine that node 208 (key value 3) has sufficient bandwidth for 5 copies. Based on this information, node 202 can update its finger table by establishing a connection to node 208 and dropping its connection to node 210 (key value 4). Node 208 learns from node 218 that node 220 (key value 14). Node 208 updates its finger table by establishing a connection to node 220 and dropping the connection to node 226 (key value 19). Node 220 may update its finger table by making connections to node 226 (key value 19) and node 232 (key value 27) and dropping key values 22 and 30, for which there are no nodes. In this example, the key values for the remaining nodes are unchanged as indicated by blank spaces for New Finger Values. The new finger values for each node are summarized in Table IV below.

TABLE IV

| Node (key value) | Old Finger values | Copies | −2, −1, +1, +2 neighbor (copy values) | New Finger values |
|---|---|---|---|---|
| 202 (0) | 1, 2, 4, 8, 16 | 2 | 27 (2), 31 (2), 1 (2), 2 (1) | 1, 2, 3, 8, 16 |
| 204 (1) | 2, 3, 5, 9, 17 | 2 | 31 (2), 0 (2), 2 (1), 3 (5) | |
| 206 (2) | 3, 4, 6, 10, 18 | 1 | 0 (2), 1 (2), 3 (5), 4 (2) | |
| 208 (3) | 4, 5, 7, 11, 19 | 5 | 1 (2), 2 (1), 4 (2), 6 (3), | 4, 6, 8, 10, 14 |
| 210 (4) | 5, 6, 8, 10, 20 | 2 | 2 (1), 3 (5), 6 (3), 8 (1) | |
| 212 (6) | 7, 8, 10, 12, 22 | 3 | 3 (5), 4 (2), 8 (1), 10 (2) | |
| 214 (8) | 9, 10, 12, 14, 24 | 1 | 4 (2), 6 (3), 10 (2), 11 (2) | |
| 216 (10) | 11, 12, 14, 18, 26 | 2 | 6 (3), 8 (1), 11 (2), 14 (4) | |
| 218 (11) | 12, 14, 15, 19, 27 | 2 | 8 (1), 10 (2), 14 (4), 16 (2) | |
| 220 (14) | 15, 16, 18, 22, 30 | 4 | 10 (2), 11 (2), 16 (2), 18 (1) | |

TABLE IV-continued

| Node (key value) | Old Finger values | Copies | −2, −1, +1, +2 neighbor (copy values) | New Finger values |
|---|---|---|---|---|
| 222 (16) | 17, 18, 20, 28, 1 | 2 | 11 (2), 14 (4), 18 (1), 19 (2) | |
| 224 (18) | 19, 20, 22, 26, 3 | 1 | 14 (4), 16 (2), 19 (2), 23 (2) | |
| 226 (19) | 20, 21, 23, 27, 4 | 2 | 16 (2), 18 (1), 23 (2), 24 (2) | |
| 228 (23) | 24, 25, 27, 31, 8 | 2 | 18 (1), 19 (2), 24 (2), 27 (2) | |
| 230 (24) | 25, 26, 28, 1, 9 | 2 | 19 (2), 23 (2), 27 (2), 31 (2) | |
| 232 (27) | 28, 29, 31, 3, 11 | 2 | 23 (2), 24 (2), 31 (2), 0 (2) | |
| 234 (31) | 0, 1, 3, 5, 7, 15 | 2 | 24 (2), 27 (2), 0 (2), 1 (2) | |

As discussed above with respect to FIG. 3, the node may determine the key values for the recipients of the copies and End ID's to send with each copy as indicated at block 514 and send the copies and End ID's to the recipient nodes, as indicated at block 516. The node may determine the key values for the recipients of the copies and End ID's using the finger table 504 and the number N of copies to send. By way of example, the node may be configured to always send a copy to the node in its finger table having the next highest key value. By way of example, node 202 with key value 0 would always send a copy to node 204 with key value 1. The End ID s sent with each message may be determined as described above with respect to FIG. 1.

Figure 6A:
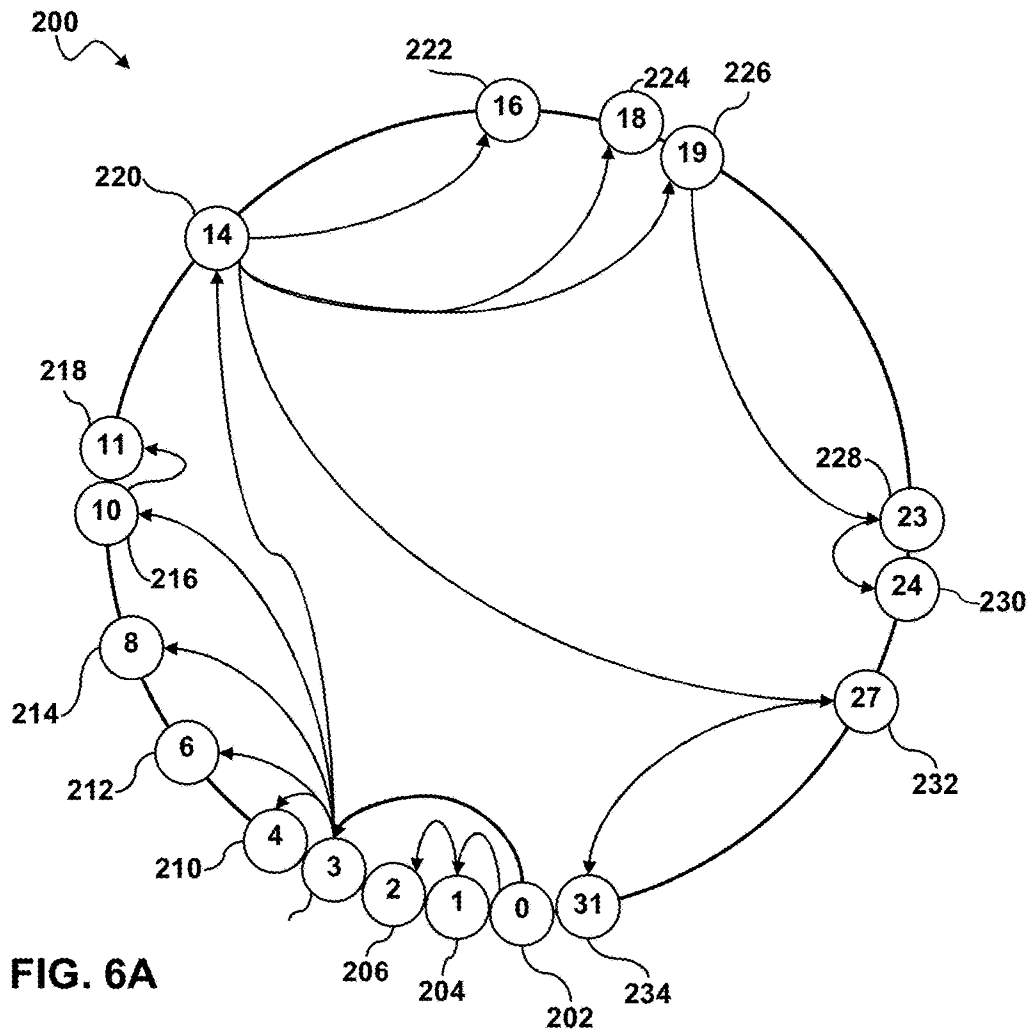
FIGS. 6A-6B are schematic diagrams illustrating an example of application-level multi-casting a message in an overlay network according to the alternative embodiment of the present invention.
Figure 6B:
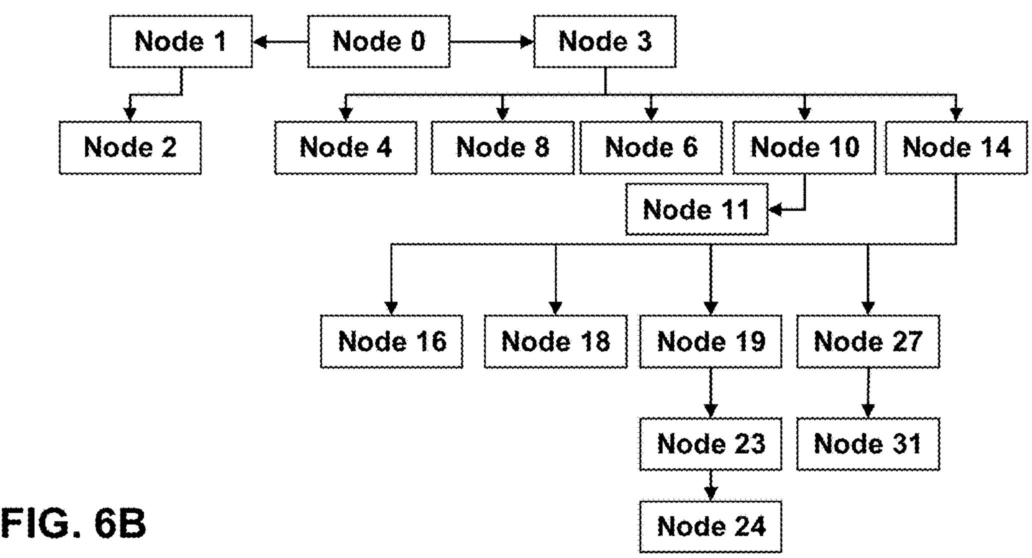

Based on the new finger values for each node as described above, broadcasting of a message according to the method 500 of FIG. 5 over the rest of the network 200 may take place as illustrated in FIGS. 6A-6B and summarized in Table V below.

TABLE V

| Node (key value) | Node | Finger values | Copies permitted within target time by available Uplink BW limit | Sends copies to nodes (End ID) | # of Hops to receive message |
|---|---|---|---|---|---|
| 202 (0) | 0 | 1, 2, 3, 8, 16 | 2 | 1 (2), 3 (0) | 0 |
| 204 (1) | 1 | 2, 3, 5, 9, 17 | 2 | 2 (3), | 1 |
| 206 (2) | 2 | 3, 4, 6, 10, 18 | 1 | Doesn't send | 2 |
| 208 (3) | 3 | 4, 6, 8, 10, 14 | 5 | 4 (6), 6 (8) 8 (10), 10 (14), 14 (0) | 1 |
| 210 (4) | 4 | 5, 6, 8, 10, 20 | 2 | Doesn't send | 2 |
| 212 (6) | 6 | 7, 8, 10, 12, 22 | 3 | Doesn't send | 2 |
| 214 (8) | 8 | 9, 10, 12, 14, 24 | 1 | Doesn't send | 2 |
| 216 (10) | 10 | 11, 12, 14, 18, 26 | 2 | 11 (14) | 2 |
| 218 (11) | 11 | 12, 14, 15, 19, 27 | 2 | Doesn't send | 2 |
| 220 (14) | 14 | 15, 16, 18, 19, 27 | 4 | 16 (18), 18 (19), 19 (27), 27 (0) | 2 |
| 222 (16) | 16 | 17, 18, 20, 28, 1 | 2 | Doesn't send | 3 |
| 224 (18) | 18 | 19, 20, 22, 26, 3 | 1 | Doesn't send | 3 |
| 226 (19) | 19 | 20, 21, 23, 27, 4 | 2 | 23 (27) | 3 |
| 228 (23) | 23 | 24, 25, 27, 31, 8 | 2 | 24 (27) | 4 |
| 230 (24) | 24 | 25, 26, 28, 1, 9 | 2 | Doesn't send | 5 |
| 232 (27) | 27 | 28, 29, 31, 3, 11 | 2 | 31 (0) | 3 |
| 234 (31) | 31 | 0, 1, 3, 5, 7, 15 | 2 | Doesn't send | 4 |

As may be seen from Table V above, by optimizing the finger tables of a relatively few nodes the message can be quickly reach high bandwidth nodes and the number of hops necessary for the message to reach the last node in the over layer can be reduced significantly. Note that most nodes, including node 234, receive the message after only 4 hops or less.

Recovering Lost Packets in an Overlay Broadcast

During the broadcasting, packet loss may occur and a real time media streaming typically uses an unreliable transport protocol such as UDP in order to prevent excessive delay due to retransmissions performed by more reliable transport protocol such as TCP. It is noted that overlay networks such as the Chord overlay were not originally designed for broadcast or for semantic search. In an overlay broadcast of the types described above, if a packet is lost in transmission to a given node, the nodes downstream from the given node will not receive the lost packet. Consequently, the media quality can degrade severely as the number of message hops increases. In an alternative embodiment of the present invention, this problem may be overcome if the nodes buffer broadcast data for benefit of downstream nodes.

A given node in a Chord overlay typically has one or more outbound connections (its finger nodes) as well as one or more in outbound connections (other nodes for which the given node is a finger node) as illustrated in the example depicted in FIGS. 7A-7D. In this example, a node 202 is receiving a broadcasting data from an upstream node 230 and is responsible for forwarding the data to multiple destination its own finger nodes, which are nodes 204, 206, 210,214, 222. Node 230 is receiving data from a broadcast source node 226. When there is only one broadcast source in the Chord overlay, it is guaranteed by nature of Chord overlay and the nature of overlay broadcasting as described herein that there is only one inbound connection via which broadcasting data is received. For example, nodes 226 and 234 are connected to node 202, but the broadcasting data will not be transmitted to node 202 by these nodes according the above-described overlay broadcast methods.

Node 202 may detect a missing piece in the data received from node 230 due to a packet loss between node 230 and node 202. Such packet loss can be detected, e.g., by inserting a sequence number in each message. If each packet has a different sequence number and the sequence numbers follow a known sequence, node 202 can detect packet loss by identifying gaps in the sequence numbers of broadcast packets that are received. According to an alternative embodiment of the invention, when such data loss is detected, node 202 can the missing data from nodes to which it has existing inbound connections and that have received the packet. By way of example, and not by way of limitation, a node can obtain a missing packet by requesting the missing packet from one or more nodes to which the node has existing inbound connections and that are likely to have received the missing packet. For example, node 202 may send such a request to any of upstream nodes 228, 230, 232 or 234 via existing inbound connections. The request need not be made to node 224 because its key value is located beyond the key value range between the broadcast source node 226 and node 202, which means that the node 224 does not have the data yet. Node 202 can determine whether a given upstream node is beyond the key value range between itself and the broadcast source 226 if the broadcast packets include data identifying broadcast source node 226 as the originator of the broadcast message.

Nodes 228, 230, 232, and 234 might not have the missing data possibly because the packet loss has occurred in inbound connections to these nodes. Even if one of these nodes has the data, the node may not have sufficient bandwidth to send the missing data to node 202. Therefore, node 202 may send a query to each of these nodes to determine if any of them has the missing data and also available bandwidth to send the missing data. When node 202 receives a response indicating that the responding node has the data and is able to send it, node 202 can request the data from the responding node. Optionally, the node may choose to wait for multiple responses for a specific time period to choose the best node from which to download the missing data, e.g., in terms of available bandwidth and/or measured round trip time (RTT).

The above process takes one RTT for node 202 to send the query and receive the response and another RTT for node 202 to request and receive the missing piece. The latency of 2*RTT may not be acceptable considering the overall latency each node would experience. In order to reduce the latency, nodes 228, 230,232, and 234 can regularly and proactively send to node 202 information identifying a set of ranges of sequence numbers for packets that these nodes have stored in memory, e.g., in a data buffer. Node 202 can similarly transmit information to its finger nodes identifying a set of ranges of sequence numbers for packets that node 202 has stored in memory. This way, one RTT for the initial query/response transaction can be eliminated. It is assumed here is that the amount of data need to transmit such information is very small, e.g., compared to a broadcast message, and transmission of such data does not significantly affect uplink, or downlink bandwidth.

Figure 7A:
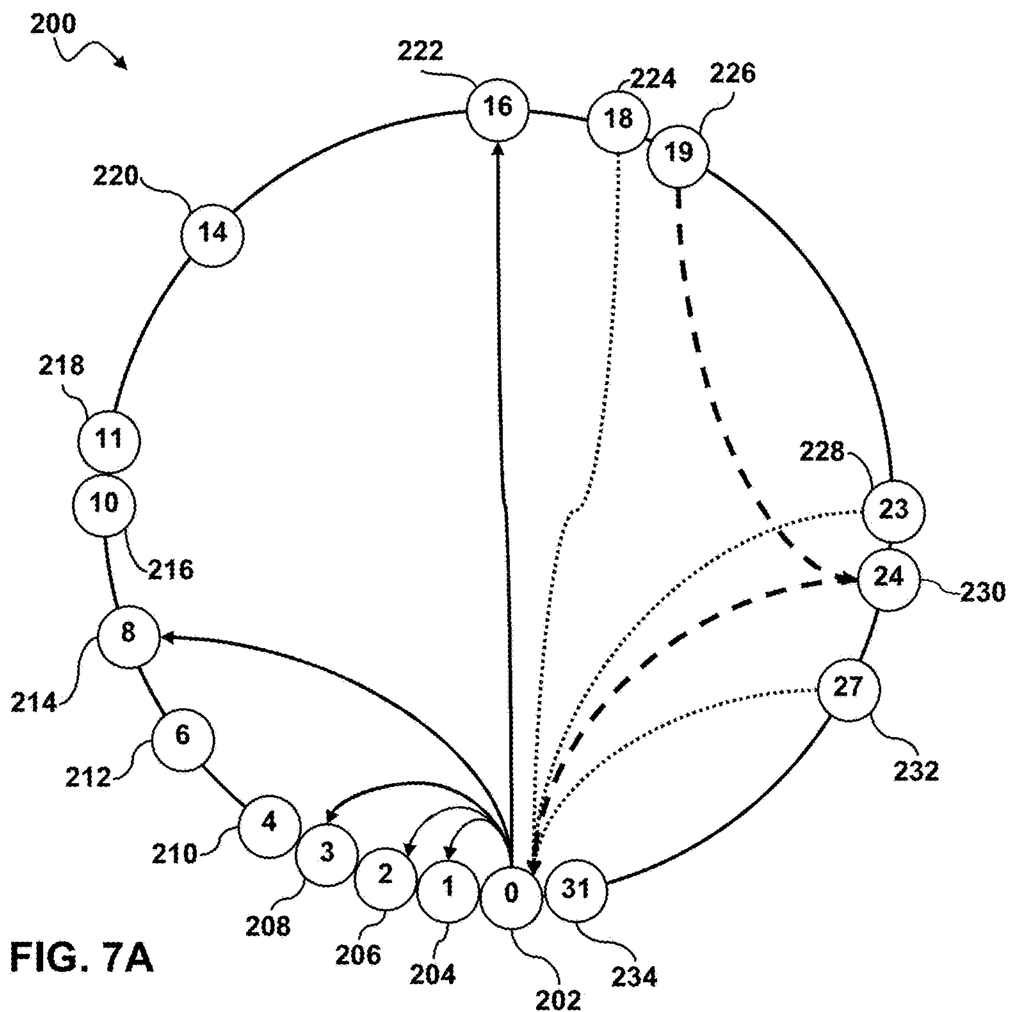
FIG. 7A is a schematic diagram illustrating an example of recovery of lost data packets in broadcasting a message in an overlay network according to an alternative embodiment of the present invention.
Figure 7B:
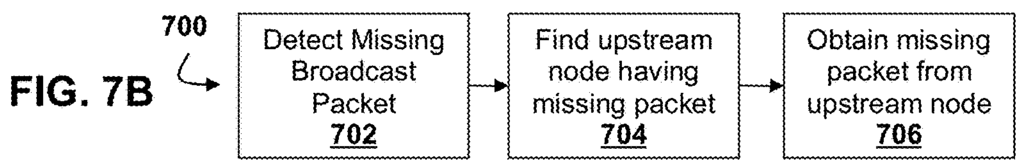
FIG. 7B is a flow diagram illustrating an example of recovery of lost broadcast data from the perspective of the node requesting a missing data packet according to an alternative embodiment of the present invention.
Figure 7C:
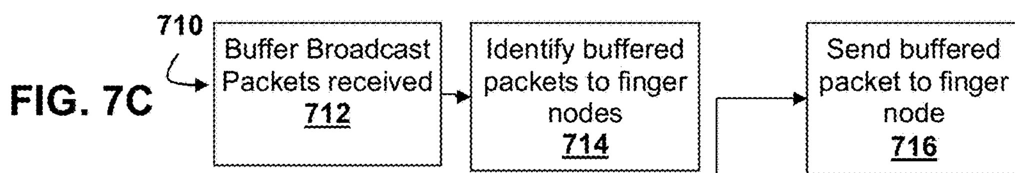
FIG. 7C is a flow diagram illustrating an example of recovery of lost broadcast data from the perspective of a node providing a missing data packet according to an alternative embodiment of the present invention.

The general method for recovery of lost data in an overlay broadcast can be summarized with reference to FIG. 7B and FIG. 7C. Specifically, from the point of view of a node requesting missing broadcast data a method 700 may proceed as follows. A node receiving overlay broadcast data may detect a missing packet as indicated at 702. As discussed above, the node can identify a missing packet if each packet includes a unique sequence number. Upon detecting the missing packet, the node may attempt to find an upstream node having the missing packet, as indicated at 704. As discussed above, the node can find an upstream node having the missing packet either by sending queries to upstream nodes to which the node has existing inbound connections and that are likely to have the packet. Alternatively, the node may receive regular updates from the nodes to which it has inbound connections regarding the packets that they have buffered. Upon finding an upstream node having the missing packet the node may obtain the missing packet from the upstream node as indicated at 706. By way of example, the node may obtain the missing packet by requesting for the missing packet from a selected upstream node that is known to have the packet. The node may consider factors such as available bandwidth and round trip time in selecting an upstream node from which to request the missing packet.

A node receiving a request for a missing overlay broadcast packet may implement a method 710 as illustrated in FIG. 7C. Specifically, the node may buffer broadcast packets that have been received as indicated at 712. The received packets can be buffered for a finite period of time before and after they are consumed. The node that receives and buffers the packets can identify the buffered packets to its finger nodes, as indicated at 714. Specifically, the node can maintain a list of sequence numbers for buffered packets and respond to a request for a specific packet from a downstream node by referring to the list or by simply transmitting the list. The list can be in the form of a range of sequence numbers for buffered packets. Alternatively, the node can identify the buffered packets to finger nodes by regularly sending the list of buffered packets or range of sequence numbers of buffered packets to its finger nodes. If the node receives a request 715 for a specific buffered packet 717 from one of its finger nodes the node can send the requested packet, as indicated at 716.

It is noted that the missing packet recovery method 700 and missing packet provision method 710 may be implemented in conjunction with overlay broadcasting, e.g., as described above with respect to FIG. 3 and/or FIG. 5. Furthermore these methods may be implemented in conjunction with overlay broadcasting as described in U.S. Pat. No. 7,468,952.

As mentioned above, obtaining the missing data may take 1 to 2 RTTs. This indicates that it is desirable for node 202 to have enough buffer in memory to allow the latency before it consumes the data, e.g., by displaying the broadcast on a display. Similarly, all nodes in the overlay 200 should be prepared to receive a request for retransmission of past data, which means, each node must keep data that has already been consumed in a buffer in memory for a while.

Figure 7D:
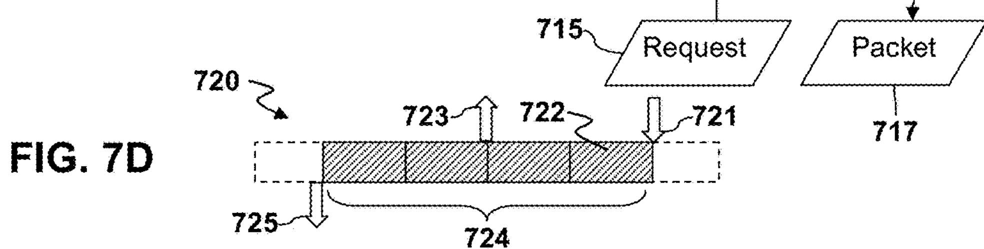
FIG. 7D is a block diagram illustrating buffering of broadcast data packets in conjunction with alternative embodiments of the present invention.

FIG. 7D, illustrates an example of a buffer 720 containing buffered packets 724. The buffer 720 may be implemented as a computer readable memory. By way of example, and not by way of limitation, the memory may include any kinds of data storage such as RAM, hard drive, flash memory, and the like. An overlay broadcast packet 722 is received in the buffer as indicated at 721. Packets that are received can be stored in the buffer 720 for some period of time before they are consumed, e.g., used by a display device, as indicated at 723. Packets can remain in the buffer for some additional period of time after they have been consumed in order to keep them available for other nodes. Since the node may continually receive overlay broadcast data and buffer space is typically limited at some point packets will have to be cleared from the buffer as indicated at 725 to make room for new packets.

Figure 8:
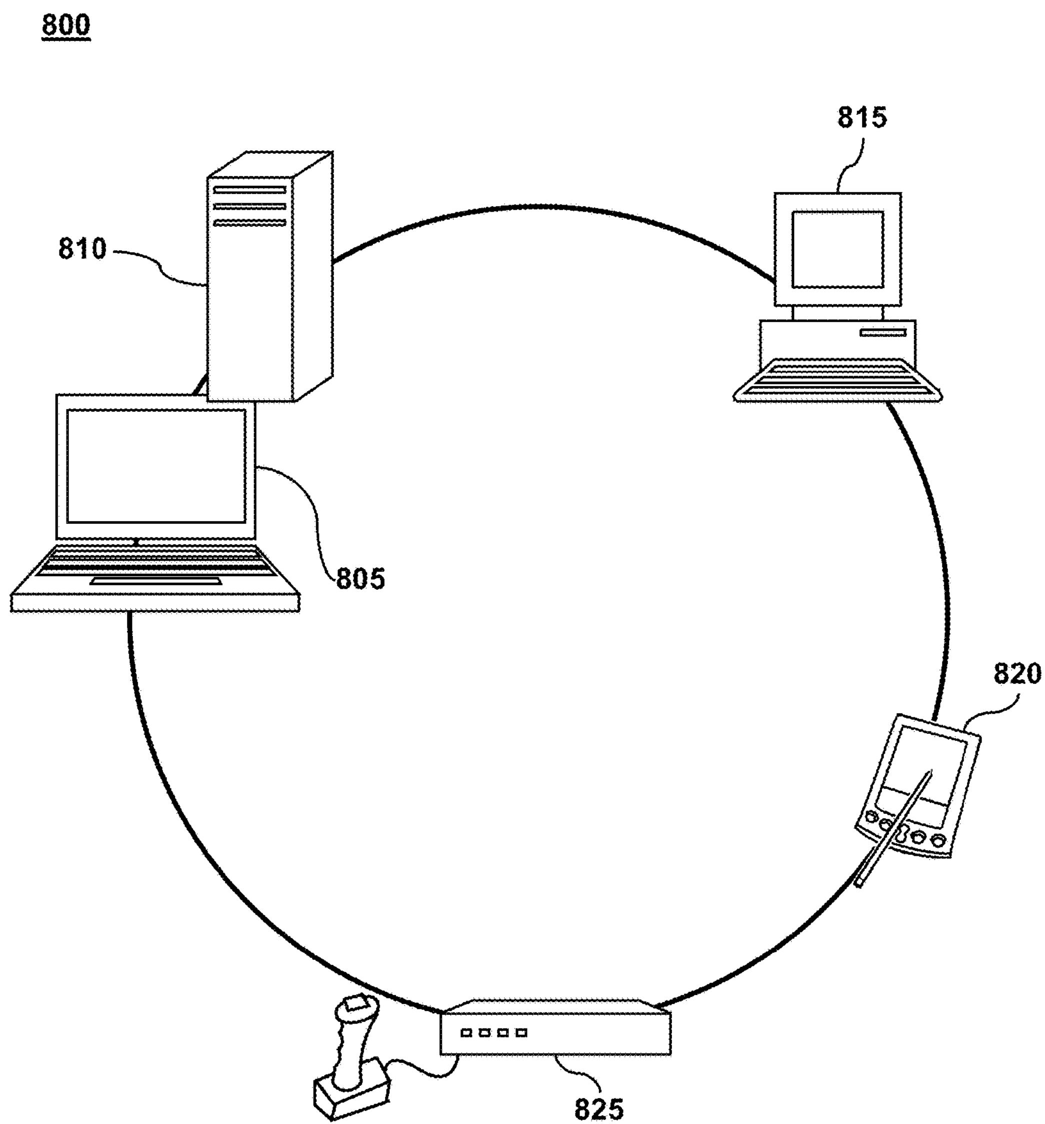
FIG. 8 illustrates a set of information processing devices suitable for implementing an overlay network according to an embodiment of the invention.

FIG. 8 illustrates a set of information processing devices suitable for implementing an overlay network 800 suitable for broadcasting messages according to an embodiment of the invention. The nodes of overlay network 800 may include laptop or portable computers 805; server computers 810; desktop computers and workstations 815; mobile computing devices 820 such as mobile phones, personal digital assistants, portable digital media players, and portable or handheld game consoles; and home entertainment devices 825 such as video game consoles, digital media players, set-top boxes, media center computers and storage devices. The overlay network 800 can include any number of each type of device independent of the number of devices of other types. Each device may implement the functionality of one or more nodes of the overlay network 800. For each device, the functionality of one or more nodes may be implemented in hardware, software, firmware, or any combination thereof. Node functionality in software may be a part of an application, a library, an application programming interface, and/or an operating system. Furthermore, each node of the overlay network 800 may be connected with other nodes via any type of wired or wireless network connection, incorporating any type of electrical, optical, radio, or other communications means. The overlay network 800 may encompass both local-area networks and wide-area networks, such as the Internet.

In a further embodiment, some devices of the overlay network 800 may have restricted capabilities. For example, only a limited subset of nodes of the overlay network 800 may be allowed to initiate broadcast messages. The remaining nodes may only be permitted to forward and/or process broadcast message. In still a further embodiment, all or a subset of the nodes of the overlay network 800 are capable of authenticating broadcast messages. Such a configuration may be implemented to prevent the spread of unauthorized broadcast messages. Upon receiving a broadcast message, a node can first determine whether the broadcast message is authentic, for example by checking a cryptographic signature. If the broadcast message is authentic, it is processed and potentially forwarded to other nodes as described above. Otherwise, the broadcast message may be ignored.

Figure 9:
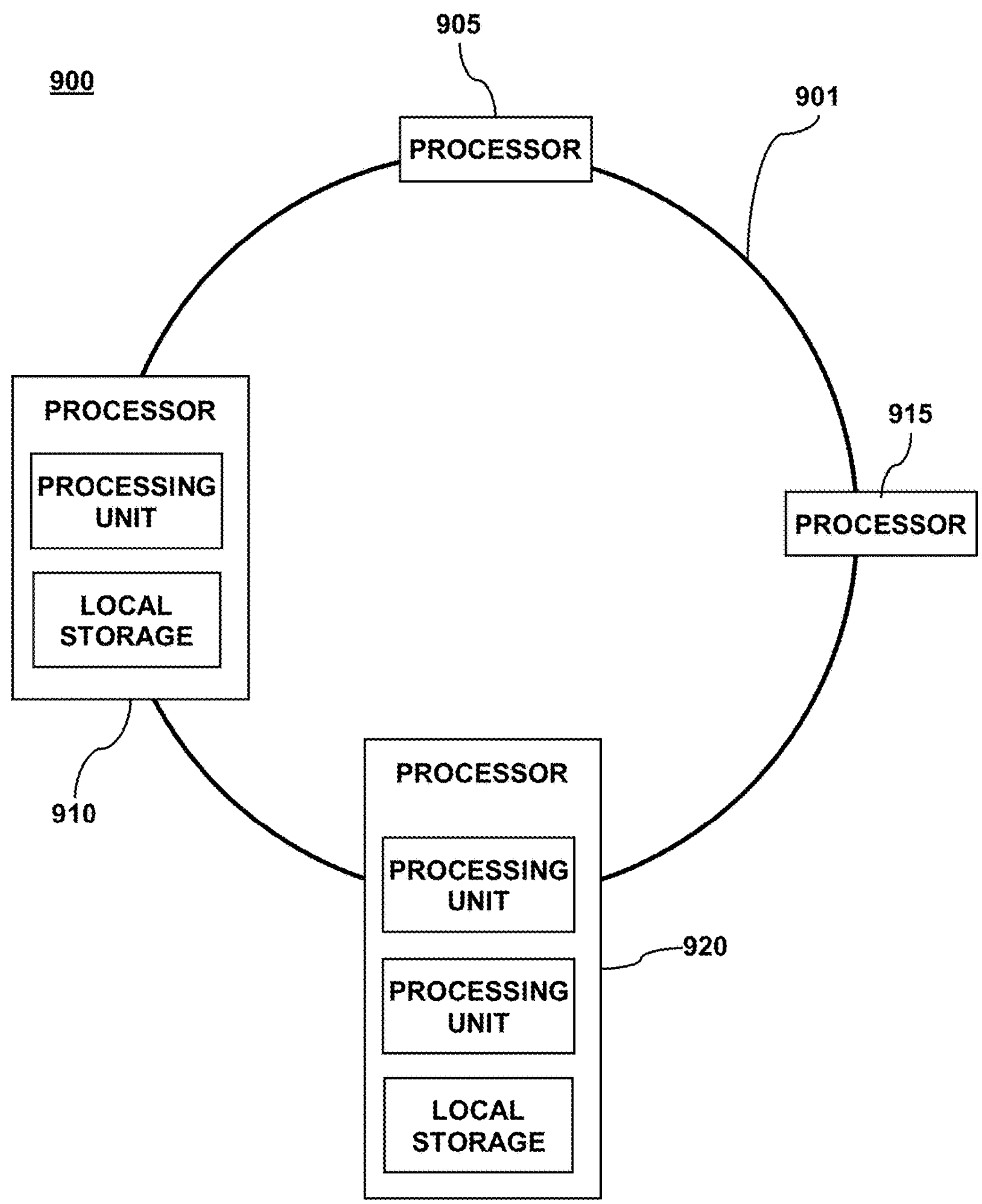
FIG. 9 illustrates a set of information processing devices suitable for implementing an overlay network according to an embodiment of the invention.

FIG. 9 illustrates a set of information processing devices suitable for implementing an overlay network 900 according to an embodiment of the invention. The overlay network 900 enables processors connected over a data bus 901 to send and receive broadcast messages in an efficient manner. The data bus 901 may use any electrical, optical, or other type of data communication means capable of carrying data within and/or between integrated circuits.

The overlay network 900 typically includes a plurality of processors 905, 910, 915, and 920. In further embodiments, overlay network 900 may include thousands or millions of processors. Each processor may be a microprocessor, microcontroller, system on a chip processor, digital signal processor, application specific integrated circuit (ASIC), programmable logic device and/or any other type of information processing device. Each processor may further include one or more processing units capable of independently executing sequences of information processing instructions or processing information according to a fixed algorithm. Each processor may include local data storage as well as access to common or shared data storage.

Figure 10:
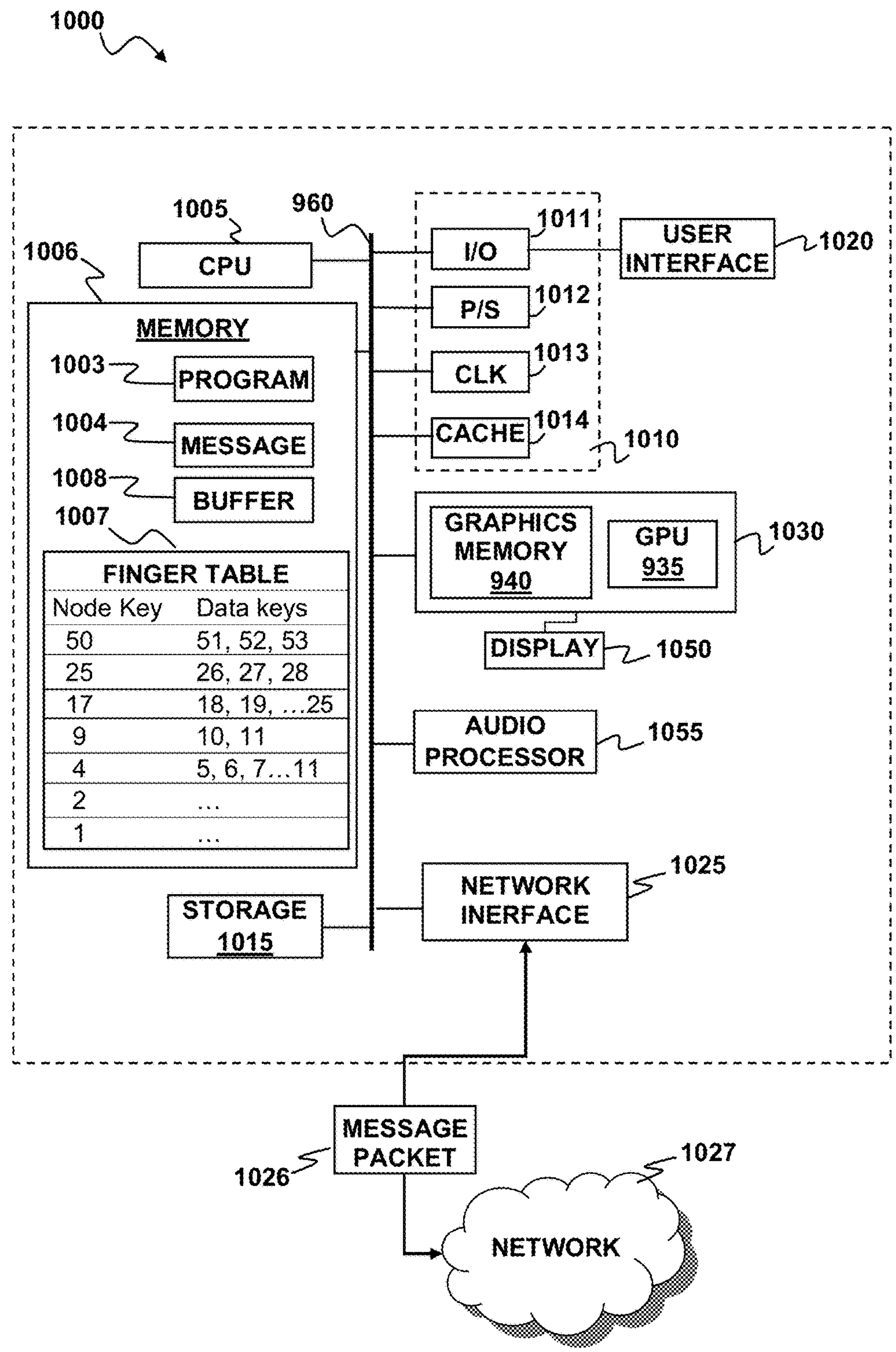
FIG. 10 illustrates the components of an information processing device suitable for implementing a node of an overlay network according to an embodiment of the invention.

FIG. 10 is a block diagram illustrating the components of an information processing device suitable for implementing a peer node of an overlay network according to an embodiment of the present invention. By way of example, and without loss of generality, the information processing device may be implemented as a computer system 1000, such as a personal computer, video game console, personal digital assistant, or other digital device, suitable for practicing an embodiment of the invention. The computer system 1000 may include a central processing unit (CPU) 1005 configured to run software applications and optionally an operating system. The CPU 1005 may include one or more processing cores. By way of example and without limitation, the CPU 1005 may be a parallel processor module, such as a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

A memory 1006 is coupled to the CPU 1005. The memory 1006 may store applications and data for use by the CPU 1005. The memory 1006 may be in the form of an integrated circuit, e.g., RAM, DRAM, ROM, and the like). A computer program 1003 may be stored in the memory 1006 in the form of instructions that can be executed on the processor 1005. The memory 1006 may store broadcast messages 1004 that have either been initiated by the program 1003 or received from other nodes. The memory 1006 may also contain a finger table 1007. The finger table contains information regarding the keys for which the node 1000 is responsible. These keys include data keys associated with data, e.g., shared files that may be stored in the storage 1015. In addition, the finger table 1007 may include node keys associated with other peer nodes. Such nodes may include a subset of the nodes in the overlay network 200 that the peer node 1000 may be able to contact directly via peer-to-peer connection. The data keys may be arranged into key groups, with each key group being associated with a different node key.

The program 1003 can determine an available uplink bandwidth and which subset of nodes corresponding to key values in the finger table 1007 should receive a copy of the message 1004 based on the available uplink bandwidth and what End ID to send to each node along with a copy of the message 1004. By way of example, and not by way of limitation, the program 1003 may be part of a video game program that allows users of different peer devices to participate in a game online over a network. Such participation may include the above-described spectator mode. The instructions of the program 1003 may be configured to implement, amongst other things, an overlay broadcast method, e.g., as described above with respect to FIG. 3 and/or an alternative broadcast method that uses finger table optimization, e.g., as described above with respect to FIG. 5. In addition, the program 1003 may include instructions to implement recovery of lost broadcast packets from upstream nodes, e.g., as discussed above with respect to FIG. 7B. Furthermore, the program 1003 may include instructions to implement provision of packets to finger nodes, e.g., as discussed above with respect to FIG. 7C. The memory 1006 may include a buffer 1008 configured as discussed above with respect to FIG. 7D to facilitate recovery and/or provision of lost packets. Although the buffer 1008 is depicted as being implemented in the memory 1006, the buffer may alternatively be implemented in the storage device 1015 or in some other storage location that is accessible by the node 1000.

The computing system 1000 may also include well-known support functions 1010, such as input/output (I/O) elements 1011, power supplies (P/S) 1012, a clock (CLK) 1013 and cache 1014. The system 1000 may further include a storage device 1015 that provides non-volatile storage for applications and data. By way of example, the storage device 1015 may be a fixed disk drive, removable disk drive, flash memory device, tape drive, CD-ROM, DVD-ROM, Blu-ray, HD-DVD, UMD, or other optical storage devices.

One or more user input devices 1020 may be used to communicate user inputs from one or more users to the computer system 1000. By way of example, one or more of the user input devices 1020 may be coupled to the system 1000 via the I/O elements 1011. Examples of suitable input device 1020 include keyboards, mice, joysticks, touch pads, touch screens, light pens, still or video cameras, and/or microphones. A network interface 1025 allows the computer system 1000 to communicate with other computer systems via an electronic communications network 1027. The network interface 1025 may include wired or wireless communication over local area networks and wide area networks such as the Internet. The system 1000 may send and receive data, e.g., broadcast messages, in the form of one or more message packets 1026 over the network 1027.

The computer system 1000 may further comprise a graphics subsystem 1030, which may include a graphics processing unit (GPU) 1035 and graphics memory 1040. The graphics memory 1040 may include a display memory (e.g., a frame buffer) used for storing pixel data for each pixel of an output image. The graphics memory 1040 may be integrated in the same device as the GPU 1035, connected as a separate device with GPU 1035, and/or implemented within the memory 1006. Pixel data may be provided to the graphics memory 1040 directly from the CPU 1005. Alternatively, the CPU 1005 may provide the GPU 1035 with data and/or instructions defining the desired output images, from which the GPU 1035 may generate the pixel data of one or more output images. The data and/or instructions defining the desired output images may be stored in memory 1010 and/or graphics memory 1040. In an embodiment, the GPU 1035 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 1035 may further include one or more programmable execution units capable of executing shader programs.

The graphics subsystem 1030 may periodically output pixel data for an image from graphics memory 1040 to be displayed on a display device 1050. The display device 1050 may be any device capable of displaying visual information in response to a signal from the computer system 1000, including CRT, LCD, plasma, and OLED displays. The computer system 1000 may provide the display device 1050 with an analog or digital signal. By way of example, the display 1050 may include a cathode ray tube (CRT) or flat panel screen that displays text, numerals, graphical symbols or images. In addition, the display 1050 may include one or more audio speakers that produce audible or otherwise detectable sounds. To facilitate generation of such sounds, the system 1000 may further include an audio processor 1055 adapted to generate analog or digital audio output from instructions and/or data provided by the CPU 1005, memory 1006, and/or storage 1015.

The components of the computer system 1000, including the CPU 1005, memory 1006, support functions 1010, data storage 1015, user input devices 1020, network interface 1025, and audio processor 1055 may be operably connected to each other via one or more data buses 1060. These components may be implemented in hardware, software or firmware or some combination of two or more of these.

Figure 11:
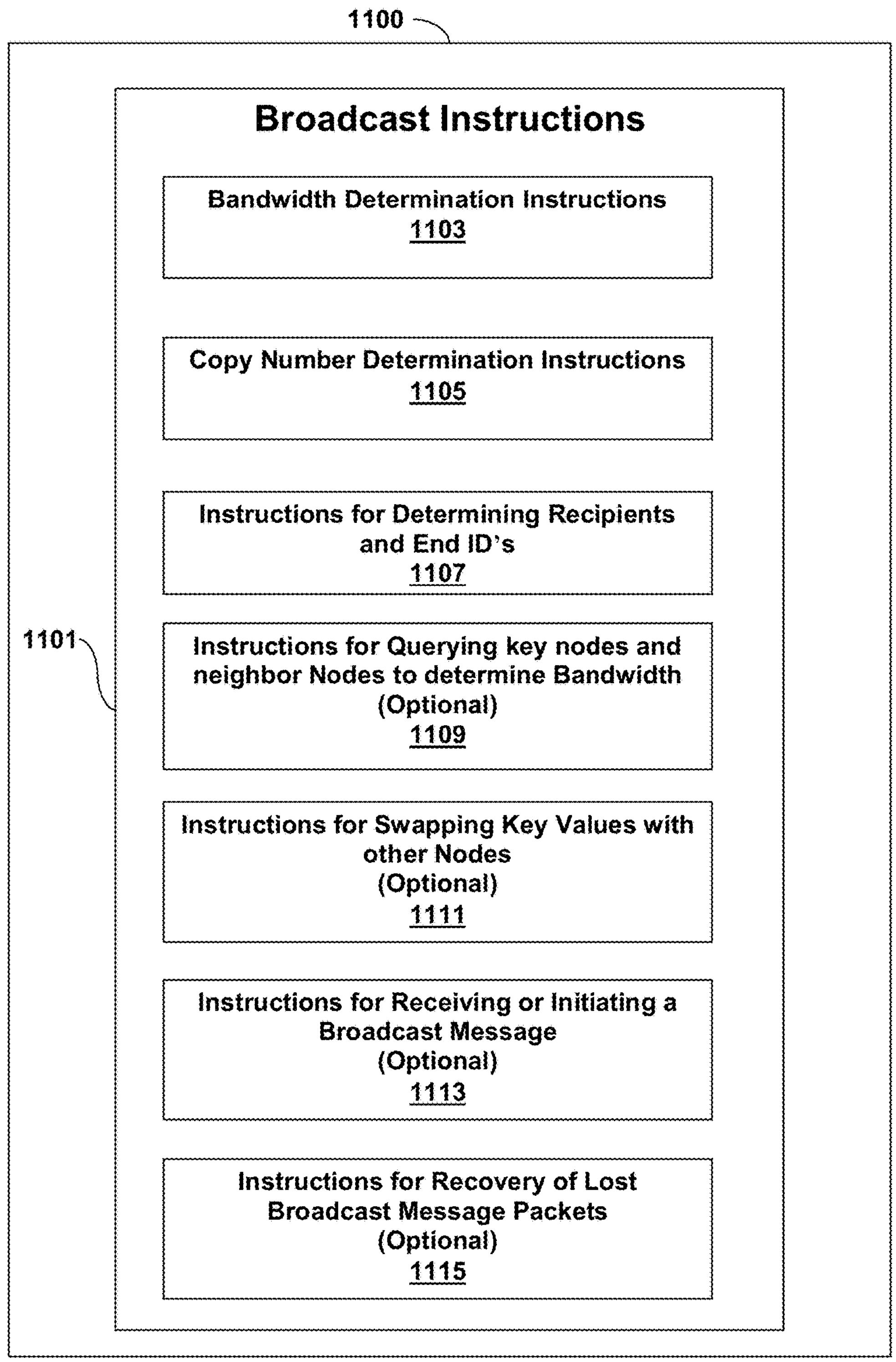
FIG. 11 illustrates an example of a computer-readable storage medium encoded with computer readable instructions for implementing application-level multicast in a peer overlay network in accordance with an embodiment of the present invention.

According to another embodiment, instructions for carrying out broadcasting in a peer-to-peer network may be stored in a computer readable storage medium. By way of example, and not by way of limitation, FIG. 11 illustrates an example of a computer-readable storage medium 1100 in accordance with an embodiment of the present invention. The storage medium 1100 contains computer-readable instructions stored in a format that can be retrieved and interpreted by a computer processing device. By way of example and not by way of limitation, the computer-readable storage medium 1100 may be a computer-readable memory, such as random access memory (RAM) or read only memory (ROM), a computer readable storage disk for a fixed disk drive (e.g., a hard disk drive), or a removable disk drive. In addition, the computer-readable storage medium 1100 may be a flash memory device, a computer-readable tape, a CD-ROM, a DVD-ROM, a Blu-Ray, HD-DVD, UMD, or other optical storage medium.

The storage medium 1100 contains broadcast instructions 1101 configured to broadcasting in a peer-to-peer overlay network upon execution by a processor in a suitably configured node on the network. The broadcast instructions 1101 may be configured to implement broadcasting in accordance with the methods described above with respect to FIG. 3 or FIG. 5. In addition, the broadcast instructions 1101 may optionally include bandwidth determination instructions 1103 that determine an available uplink bandwidth for a node when executed by the processor.

The broadcast instructions 1101 may also include copy number determination instructions 1105 for determining a number of copies of a broadcast message to send to finger nodes when executed by the processor. These instructions may take into account an available uplink bandwidth determined by the bandwidth determination instructions 1103.

The broadcast instructions 1101 may also include instructions 1107 that determine recipients for copies of a message and End ID's to send to these recipients when executed by the processor. These instructions can be configured to take into account the number of copies determined by the copy number determination instructions 1105 as well as the key values stored in a finger table whose contents are accessible to the processor.

The broadcast instructions 1101 may optionally include instructions 1109 for querying other nodes, such as key nodes and neighbor nodes to determine uplink bandwidth available to these other nodes.

The broadcast instructions 1101 may optionally include instructions 1111 configured for swapping key values with other nodes. These instructions may take into account information about uplink bandwidth available to other nodes, e.g., as determined by execution of the instructions 1109 for querying other nodes.

In some embodiments, the instructions 1101 may include instructions 1113 for receiving or initiating a broadcast message. By way of example, and not by way of limitation, these instructions may be configured to implement part of a spectator mode of an online video game when executed, as discussed above. Specifically, the instructions 1113 could be configured to implement the "virtual camera" function on a node that acts as an agent. Alternatively, the instructions could be configured to identify message received packets as being associated with the spectator mode and handling them appropriately, e.g., by determining the size of the broadcast message and placing them in a queue for transmission.

In other embodiments, the instructions 1101 may include instructions 1115 for recovering missing broadcast message packets. By way of example, and not by way of limitation, these instructions 1115 may be configured to implement recovery of packets missing from broadcast messages received by a node, e.g., as described above with respect to FIG. 7A and FIG. 7B. Alternatively, these instructions 1115 may be configured to facilitate provision of broadcast packets to other nodes, e.g., as described above with respect to FIG. 7A and FIG. 7C.

Although the present invention has been described in considerable detail with reference to certain preferred versions thereof, other versions are possible. For example, although certain embodiments are described in which the overlay is described as a Chord overlay, embodiments of the invention may include implementations in which the overlay is implemented according to some other protocol. Therefore, the spirit and scope of the appended claims should not be limited to the description of the preferred versions contained herein. Instead, the scope of the invention should be determined with reference to the appended claims, along with their full scope of equivalents.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Any feature, whether preferred or not, may be combined with any other feature, whether preferred or not. In the claims that follow, the indefinite article "A", or "An" refers to a quantity of one or more of the item following the article, except where expressly stated otherwise. Any element in a claim that does not explicitly state "means for" performing a specified function, is not to be interpreted as a "means" or "step" clause as specified in 35 USC §112, ¶6. In particular, the use of "step of" in the claims herein is not intended to invoke the provisions of 35 USC §112, ¶6.

The reader's attention is directed to all papers and documents which are filed concurrently with this specification and which are open to public inspection with this specification, and the contents of all such papers and documents incorporated herein by reference.

What is claimed is:

1. In a peer node coupled to a plurality of other peer nodes in an overlay network, a method of processing a broadcast message in the overlay network, the method comprising:

a) identifying packet missing from a broadcast message from another peer nodes that is upstream from the peer node, wherein the broadcast message includes a plurality of packets;

b) identifying an upstream node having the missing packet, wherein the peer node has an existing inbound connection with the upstream node; and c) obtaining the missing packet from the upstream node.

2. The method of claim 1, wherein each packet in the plurality of packets includes a unique sequence number of a known sequence and wherein a) includes identifying a missing sequence number in the plurality of packets.

3. The method of claim 1, wherein b) includes sending a request for the missing packet to one or more nodes upstream of the peer node to which the peer node has inbound connections.

4. The method of claim 1, wherein b) includes periodically receiving an update from one or more nodes upstream of the peer node to which the peer node has inbound connections, wherein each update identifies a range of packets that are available from the node that sent the update.

5. The method of claim 1, wherein b) includes requesting the missing packet from a selected upstream node that is known to have the packet.

6. The method of claim 5, wherein the peer node takes available bandwidth and/or round trip time into account in selecting an upstream node from which to request the missing packet.

7. In a peer node coupled to a plurality of other peer nodes in an overlay network, wherein the plurality of other peer nodes include one or more finger nodes to which the peer node has outbound connections and one or more upstream nodes to which the peer node has inbound connections, a method of processing a broadcast message in the overlay network, the method comprising:

a) buffering a subset of the packets of a plurality packets of a broadcast message in a buffer for a finite period of time before and after the peer node consumes the packets, wherein the broadcast message is from an upstream node that is upstream from the peer node; and b) identifying one or more of the buffered packets to one or more of the finger nodes.

8. The method of claim 7, wherein b) includes maintaining a list of sequence numbers for buffered packets and respond to a request for a specific packet from one of the finger nodes.

9. The method of claim 7 wherein b) includes regularly sending information identifying buffered packets to the finger nodes.

10. The method of claim 7, further comprising:

d) sending one or more of the packets in the buffer to one of the finger nodes in response to a request from the finger node for the buffered packet.

11. An apparatus for implementing a peer node, comprising, a processor;

a memory coupled to the processor; and instructions embodied in the memory for execution by the processor, wherein the instructions are configured to, when executed, implement a method of processing a broadcast message in an overlay network in which the peer node is coupled to a plurality of other peer nodes, the method comprising:

a) identifying a packet missing from a broadcast message that includes a plurality of packets, wherein the broadcast message is from another peer node that is upstream of the peer node; and b) identifying an upstream node having the missing packet, wherein the peer node has an existing inbound connection with the upstream node; and obtaining the missing packet from the upstream node.

12. An apparatus for implementing a peer node, comprising, a processor;

a memory coupled to the processor; and instructions embodied in the memory for execution by the processor, wherein the instructions are configured to, when executed, implement a method of processing a broadcast message in an overlay network in which the peer node is coupled to a plurality of other peer nodes, the method comprising:

a) buffering a subset of the packets of a plurality packets of a broadcast message in a buffer for a finite period of time before and after the peer node consumes the packets, wherein the broadcast message is from an upstream node that is upstream from the peer node; and b) identifying one or more of the buffered packets to one or more of the finger nodes.

13. A non-transitory computer readable medium having embodied therein computer executable instructions that when executed cause a system having a processor and a memory coupled to the processor to implement a method of processing a broadcast message in an overlay network in which the peer node is coupled to a plurality of other peer nodes, the method comprising, the method comprising:

a) identifying packet missing from a broadcast message from another peer nodes that is upstream from the peer node, wherein the broadcast message includes a plurality of packets;

b) identifying an upstream node having the missing packet, wherein the peer node has an existing inbound connection with the upstream node; and c) obtaining the missing packet from the upstream node.

14. A non-transitory computer readable medium having embodied therein computer executable instructions that when executed cause a system having a processor and a memory coupled to the processor to implement a method of processing a broadcast message in an overlay network in which the peer node is coupled to a plurality of other peer nodes, the method comprising, the method comprising:

a) buffering a subset of the packets of a plurality packets of a broadcast message in a buffer for a finite period of time before and after the peer node consumes the packets, wherein the broadcast message is from an upstream node that is upstream from the peer node; and b) identifying one or more of the buffered packets to one or more of the finger nodes.

* * * * *